(12) United States Patent
Miyata

(10) Patent No.: US 10,515,552 B2
(45) Date of Patent: Dec. 24, 2019

(54) DRIVING ASSIST APPARATUS

(71) Applicant: TOYOTA JIDOSHA KABUSHIKI KAISHA, Toyota-shi, Aichi-ken (JP)

(72) Inventor: Shunsuke Miyata, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/990,995

(22) Filed: May 29, 2018

(65) Prior Publication Data
US 2018/0357904 A1 Dec. 13, 2018

(30) Foreign Application Priority Data

Jun. 9, 2017 (JP) .................................. 2017-114774

(51) Int. Cl.
*G08G 1/16* (2006.01)
*B60W 50/14* (2012.01)

(52) U.S. Cl.
CPC ............. *G08G 1/166* (2013.01); *B60W 50/14* (2013.01); *B60W 2420/42* (2013.01); *B60W 2550/402* (2013.01)

(58) Field of Classification Search
None
See application file for complete search history.

(56) References Cited

U.S. PATENT DOCUMENTS

| | | | |
|---|---|---|---|
| 9,721,472 B2* | 8/2017 | Jain | G08G 1/167 |
| 10,011,281 B1* | 7/2018 | Kang | B60W 30/18163 |
| 10,074,279 B1* | 9/2018 | Xu | B60W 10/20 |
| 2010/0042282 A1* | 2/2010 | Taguchi | B60W 30/12 701/25 |
| 2013/0054106 A1* | 2/2013 | Schmudderich | B60W 30/0956 701/96 |
| 2013/0293395 A1* | 11/2013 | Ohama | G08G 1/16 340/904 |
| 2015/0100228 A1* | 4/2015 | Sudou | G01S 1/02 701/300 |
| 2015/0197249 A1* | 7/2015 | Sakima | B60W 30/165 701/96 |
| 2015/0266477 A1* | 9/2015 | Schmudderich | B60W 30/09 701/98 |

(Continued)

FOREIGN PATENT DOCUMENTS

JP 2009-274594 A 11/2009

*Primary Examiner* — Navid Ziaeianmehdizadeh
(74) *Attorney, Agent, or Firm* — Sughrue Mion, PLLC

(57) ABSTRACT

In a driving assist apparatus for assisting a lane change from an own lane to a target lane, when a post-smoothing probability obtained by smoothing a time course change in "a lane presence possibility which increases with the possibility that a target is another vehicle traveling in the target lane (target lane other vehicle)" is greater than a threshold value, that target can be extracted as the target lane other vehicle. The post-smoothing probability requires some length of time to coincide with the lane presence possibility. Therefore, if after completion of a lane change, another lane change is immediately started in the same direction, there arises a possibility that the target lane other vehicle cannot be extracted properly. Therefore, in the case where after completion of a lane change, another lane change is started in the same direction, the lane change is not started until a re-change prohibition time elapses.

2 Claims, 9 Drawing Sheets

(56) References Cited

U.S. PATENT DOCUMENTS

| | | | |
|---|---|---|---|
| 2016/0107687 A1* | 4/2016 | Yamaoka | B62D 15/0255 |
| | | | 701/41 |
| 2016/0297447 A1* | 10/2016 | Suzuki | B60W 30/16 |
| 2017/0151982 A1* | 6/2017 | Fujii | B60W 10/20 |
| 2017/0327115 A1* | 11/2017 | Tokimasa | B60R 21/00 |
| 2017/0349212 A1* | 12/2017 | Oshida | G01L 5/221 |
| 2018/0015923 A1* | 1/2018 | Kurumisawa | B60W 30/16 |
| 2018/0170388 A1* | 6/2018 | Shin | B60W 30/18163 |
| 2018/0178790 A1* | 6/2018 | Oguri | B60W 30/0956 |
| 2018/0188735 A1* | 7/2018 | Sugawara | B60W 30/095 |
| 2018/0253975 A1* | 9/2018 | Mizutani | G08G 1/167 |
| 2018/0261094 A1* | 9/2018 | Nishimura | G08G 1/166 |
| 2018/0281785 A1* | 10/2018 | Berntorp | G08G 1/166 |
| 2019/0016339 A1* | 1/2019 | Ishioka | B60W 30/0956 |

* cited by examiner

DRIVING ASSIST APPARATUS

BACKGROUND OF THE INVENTION

Field of the Invention

The present invention relates to a driving assist apparatus which assists a lane change from "an own lane (original lane) which is a lane in which an own vehicle is traveling" to "a target lane which is a lane adjacent to the own lane."

Description of the Related Art

Conventionally, there have been proposed driving assist apparatuses which assist driver's steering operation when the driver performs a lane change for his/her vehicle (own vehicle). The proposed driving assist apparatuses execute control for automatically changing the turn angle of turnable wheels so as to assist the driver's steering operation (i.e., lane change assist control). One of such driving assist apparatuses (hereinafter also referred to as "a conventional apparatus") is configured to execute the lane change assist control when the apparatus determines, on the basis of the operation state of a winker lever (direction indicator lever), that the driver wishes to make a lane change (see, for example, Japanese Patent Application Laid-Open (kokai) No. 2009-274594 (in particular, paragraphs [0027], [0029], and [0053])). The conventional apparatus obtains the positions of other vehicles traveling in the own lane (original lane) and in the target lane, and prohibits execution of the lane change assist control if there is a high possibility that the own vehicle will collide with another vehicle upon the lane change from the original lane to the target lane.

Incidentally, a vehicle which includes a driving assist apparatus for executing the lane change assist control generally has an onboard surrounding monitoring sensor (for example, an onboard camera and a millimeter wave radar) for detecting another vehicle traveling in the own lane (own lane other vehicle) and another vehicle traveling in the target lane (target lane other vehicle). The surrounding monitoring sensor obtains the relative positions (target positions) of targets around the own vehicle in relation to the own vehicle, and outputs the target positions to the driving assist apparatus. On the basis of the target positions, the driving assist apparatus extracts a target corresponding to the own lane other vehicle and a target corresponding to the target lane other vehicle.

For example, in the case where the position of a target is near the lateral center of the target lane (in the width direction of the lane) and the distance between the target position and the own vehicle in the travel direction (in the front-back direction) is small, it is possible to determine that the probability that that target is the target lane other vehicle (target lane probability) is high. Meanwhile, the error of the target position obtained by the surrounding monitoring sensor (i.e., the difference between the actual position of the target and the position represented by the target position) may increase temporarily due to, for example, a change in the measurement accuracy of the surrounding monitoring sensor and a change in the inclination of the surface of a portion of the target facing the own vehicle, the inclination being in relation to the own vehicle.

For example, if the target lane probability sharply decreases temporarily as a result of a temporary increase in the acquisition error of the target position, despite that target being "a target lane other vehicle with which the own vehicle is highly likely to collide when it performs a lane change," there is a possibility that that target is determined not to be the target lane other vehicle. In contrast, if the target lane probability sharply increases temporarily as a result of a temporary increase in the acquisition error of the target position, despite that target being not the target lane other vehicle, there is a possibility that that target is determined to be the target lane other vehicle.

The sharp change in the target lane probability due to a temporary increase in the target position acquisition error may make it impossible to properly determine whether or not a lane change can be performed. In order to avoid such a situation, the driving assist apparatus may determine whether or not the target is the target lane other vehicle on the basis of "post-smoothing probability." The post-smoothing probability is a value obtained by smoothing the target lane probability obtained every time a predetermined time elapses. In this case, when the post-smoothing probability is higher than a predetermined probability threshold, the driving assist apparatus determines that that target is the target lane other vehicle.

If the target lane probability maintains a constant value, the post-smoothing probability becomes equal to the target lane probability. In addition, even when the target position acquisition error increases temporarily (namely, even when the target lane probability changes temporarily), a change in the post-smoothing probability is small (see a chain line L5 (showing changes in the target lane probability with time Ts) and a continuous line L6 (showing changes in the post-smoothing probability with time Ts) of FIG. 6). Therefore, even when the target position acquisition error increases temporarily, it is possible to properly determine whether or not that target is the target lane other vehicle.

However, in the case where the determination as to whether or not the target is the target lane other vehicle is made on the basis of the post-smoothing probability, when the target lane probability becomes higher than the probability threshold, the post-smoothing probability becomes higher than the probability threshold with slight time delay.

Therefore, for example, in the case where, immediately after the completion of the lane change assist control for assisting a lane change to a lane (first target lane) located adjacently on the right side of the own lane, the lane change assist control for assisting a lane change to a lane (second target lane) located adjacently on the right side of the first target lane is started, there is a possibility that another vehicle traveling in the second target lane cannot be extracted. More specifically, after the own vehicle has entered the first target lane, the driving assist apparatus starts to detect another vehicle traveling in the second target lane as the target lane other vehicle. As a result, there is a possibility that when the lane change assist control for assisting the lane change to the second target lane is started, the post-smoothing probability regarding another vehicle traveling in the second target lane has not yet increased to a target lane probability reflecting the actual target position of that vehicle.

In other words, in the case where, after completion of the lane change assist control for a lane change in "a specific direction" which is either of the leftward direction and the rightward direction, the lane change assist control is again performed for a new lane change in the specific direction, there arises a possibility that the determination as to whether to permit the change assist control for the new lane change cannot be made properly on the basis of the presence/absence of another vehicle traveling in the new target lane.

One object of the present invention is to provide a driving assist apparatus which performs lane change assist control for a lane change in a specific direction and for a new lane change in the specific direction after completion of the former lane change and which can properly determine whether or not the possibility of collision with another vehicle traveling in a new target lane is high, before the new lane change is started.

A driving assist apparatus which achieves the above-described object (hereinafter also referred to as "the apparatus of the present invention") includes a target position obtainment section, a probability obtainment section, a smoothing process section, an other vehicle extraction section, a control execution section, and a control prohibition section.

Said target position obtainment section (a millimeter wave radar 42 and a DS ECU 20) detects at least one target present around an own vehicle (10) and obtains a target position (a longitudinal position Dx and a lateral position Dy, and a corrected longitudinal position Dmx and a corrected lateral position Dmy) representing a position of said target in relation to said own vehicle.

Said probability obtainment section (the DS ECU 20) obtains a target lane probability (a left lane presence probability PLi and a right lane presence probability PRi) regarding said detected target in accordance with said target position, said target lane probability increasing with a possibility that said target is a target lane other vehicle which is another vehicle traveling in a target lane which is a lane located adjacent, in a specific direction which is a leftward or rightward direction, to a lane in which said own vehicle is traveling.

Said smoothing process section (the DS ECU 20) obtains a post-smoothing probability (a post-smoothing left lane probability PLs and a post-smoothing right lane probability PRs) regarding said detected target by smoothing a time course change in said target lane probability regarding said detected target.

Said other vehicle extraction section (the DS ECU 20) extracts said target as said target lane other vehicle when said post-smoothing probability regarding said detected target is greater than a predetermined probability threshold (a probability threshold Pth) (steps 875 and step 885 of FIG. 8).

Said control execution section (the DS ECU 20) executes a lane change assist control for assisting a lane change to said target lane by controlling a turn angle of turnable wheels of said own vehicle (angle corresponding to steering angle θs) when predetermined control start conditions (conditions (S1) to (S8)) are satisfied, the control start conditions including a determination (condition (S5)) that said own vehicle does not collide with said extracted target lane other vehicle during the lane change to said target lane.

Said control prohibition section (the DS ECU 20) prohibits execution of said lane change assist control for a new lane change to a lane adjacent to said target lane in said specific direction until a predetermined re-change prohibition time (a re-change prohibition time Tint) elapses after a predetermined specific condition (an LCS completion condition) is satisfied, the specific condition including entry of said own vehicle into said target lane (a condition (S8) becomes unsatisfied when a condition (pa) and/or a condition (pb) is not satisfied).

For example, the specific condition is a condition which is satisfied when the amount of separation between the lateral center of the own vehicle and the lateral center of the target lane becomes smaller than a predetermined threshold. The re-change prohibition time is set to a time longer than a time required for a post-smoothing probability regarding a target lane other vehicle newly detected by the target position obtainment section after the specific condition has been satisfied to become approximately equal to a target lane probability corresponding to the actual target position of that another vehicle. Accordingly, the apparatus of the present invention can properly determine whether or not the possibility of collision with another vehicle traveling in a new target lane is high before start of the lane change assist control for a new lane change in the specific direction after completion of the lane change assist control for the previous lane change in the specific direction.

In one mode of the apparatus of the present invention, said control start conditions include a condition (a condition (S7)) that a specific operation performed on a winker lever (a winker lever 52) of said own vehicle has continued beyond a predetermined time (a support request confirmation time Tr), continuation of said specific operation resulting in execution of a turn signal process of blinking a direction indicator (a left turn signal lamp 73a or a right turn signal lamp 73b) of said own vehicle, and said control execution section continues said turn signal process, even when said specific operation is not performed, during a period between a point when said lane change assist control has been started and a point when said specific condition is satisfied (steps 910 and 950 of FIG. 9).

According to this mode, when the lane change assist control is started, the turn signal process continues until the specific condition is satisfied even if the driver stops the operation (specific operation) on the winker lever. After that, the lane change assist control is not started until the re-change prohibition time elapses after the turn signal process ends due to satisfaction of the specific condition. In other words, the driver of the vehicle (own vehicle) to which the apparatus of the present invention is applied can recognize the beginning of a period during which the lane change assist control for a lane change in the specific direction is prohibited, when the turn signal process ends.

Notably, in the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE PREFERRED EMBODIMENTS

Figure 1:
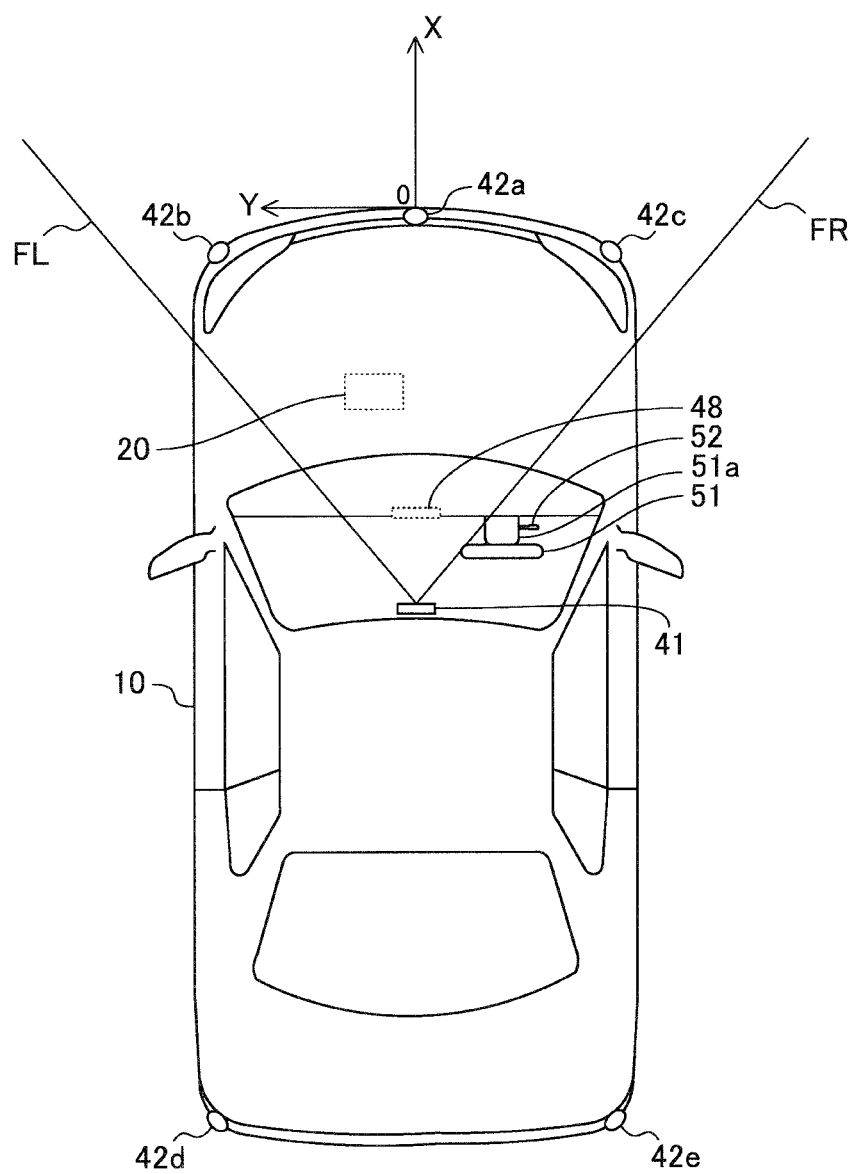
FIG. 1 is a schematic diagram of a vehicle (present vehicle) on which a driving assist apparatus according to an embodiment of the present invention (present assist apparatus) is mounted.

A driving assist apparatus according to an embodiment of the present invention (hereinafter also referred to as "the present assist apparatus") will now be described with reference to the drawings. The present assist apparatus is applied to a vehicle 10 shown in FIG. 1. As shown in FIG. 2, which is a block diagram of the present assisting apparatus, the present assist apparatus includes "a driving assist ECU 20, an engine ECU 31, a brake ECU 32, an EPS ECU 33, and a meter ECU 34" each of which is an electronic control unit (ECU). Notably, the functions realized by some of or all the ECUs may be realized by a single ECU, and the function realized by one of the ECUs may be realized by a plurality of ECUs. In the following description, the driving assist ECU 20 will also be referred to as "the DS ECU 20."

The DS ECU 20 includes a CPU, a ROM, and a RAM. The CPU performs data reading, numerical computation, computation result output, etc. by repeatedly executing predetermined programs (routines). The ROM stores the programs executed by the CPU, lookup tables (maps), etc. The RAM stores data temporarily.

Like the DS ECU 20, each of the engine ECU 31, the brake ECU 32, the EPS ECU 33, and the meter ECU 34 includes a CPU, a ROM, and a RAM. These ECUs can perform data communication (can exchange data) with one another through a CAN (controller area network) 35. In addition, through the CAN 35, each ECU can receive from "other ECUs" output values of sensors connected to the other ECUs.

The DS ECU 20 is connected to a front camera 41, a millimeter wave radar 42, a vehicle speed sensor 43, an acceleration sensor 44, a yaw rate sensor 45, a GPS receiving section 46, a map database 47, an input output device 48, and speakers 49.

The front camera 41 is disposed at a position near a room mirror (not shown) provided at a center upper portion of the windshield of the vehicle 10. The front camera 41 captures an image of a region in front of the vehicle 10 (hereinafter also referred to as "a front image") and outputs a signal representing the front image to the DS ECU 20. The angle of view (field of view) of the front camera 41 in the horizontal direction is equal to the angle formed between a straight line FL and a straight line FR shown in FIG. 1.

The millimeter wave radar 42 includes a front center radar 42a, a front left radar 42b, a front right radar 42c, a rear left radar 42d, and a rear right radar 42e, each of which is a radar unit.

Figure 2:
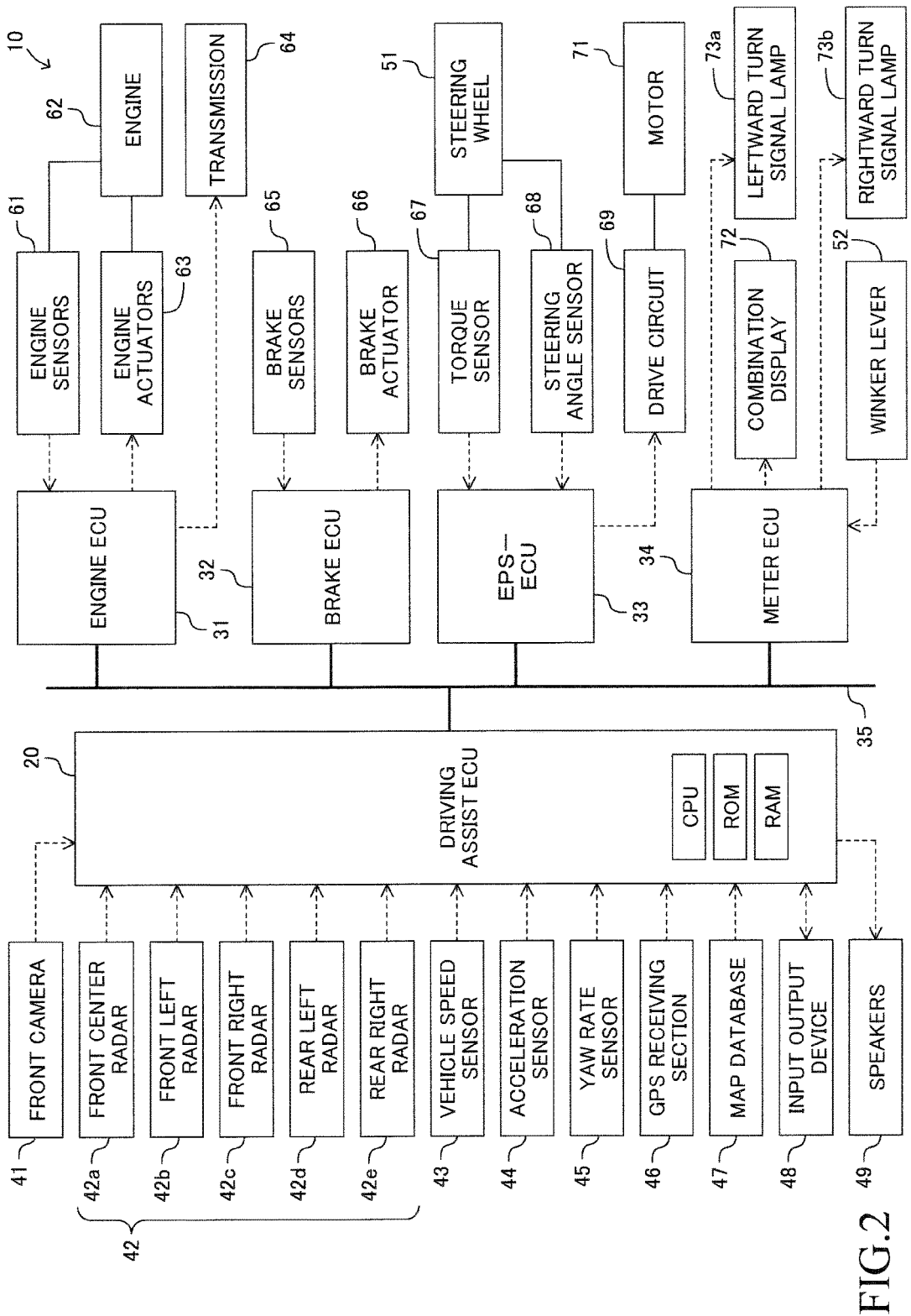
FIG. 2 is a block diagram of the present assist apparatus.

As shown in FIG. 1, the front center radar 42a is disposed at the center of the front end of the vehicle 10. The front center radar 42a detects a target in a region located forward of the vehicle 10.

The front left radar 42b is disposed at the front left corner of the vehicle 10. The front left radar 42b detects a target in a region located forward and leftward of the vehicle 10.

The front right radar 42c is disposed at the front right corner of the vehicle 10. The front right radar 42c detects a target in a region located forward and rightward of the vehicle 10.

The rear left radar 42d is disposed at the rear left corner of the vehicle 10. The rear left radar 42d detects a target in a region located rearward and leftward of the vehicle 10.

The rear right radar 42e is disposed at the rear right corner of the vehicle 10. The rear right radar 42e detects a target in a region located rearward and rightward of the vehicle 10.

Each of the radar units contained in the millimeter wave radar 42 includes a transmission section, a receiving section, and a signal processing section (which are not illustrated). The transmission section radiates (transmits) a radio wave of the millimeter wave band (hereinafter also referred to as "a millimeter wave" for simplification). The receiving section receives a millimeter wave reflected by a target (for example, another vehicle, a pedestrian, a guard rail, or a structure) which is present within the radiation range (namely, the receiving section receives a reflected wave).

On the basis of the phase difference between the transmitted millimeter wave and the received reflected wave, the frequency difference therebetween, the attenuation level of the reflected wave, the time between the transmission of the millimeter wave and the reception of the reflected wave, etc., the signal processing section obtains, as "target information," information representing the direction of the target with respect to the vehicle 10, the distance between the vehicle 10 and the target, the relative speed of the target with respect to the vehicle 10, etc. every time a predetermined time elapses. Further, the signal processing section outputs the obtained target information to the DS ECU 20.

The vehicle speed sensor 43 detects vehicle speed Vs which is the travel speed of the vehicle 10 and outputs a signal representing the vehicle speed Vs to the DS ECU 20.

The acceleration sensor 44 detects the acceleration As of the vehicle 10 in the longitudinal direction and outputs a signal representing the acceleration As to the DS ECU 20.

The yaw rate sensor 45 detects the yaw rate YRt of the vehicle 10 and outputs a signal representing the yaw rate YRt to the DS ECU 20. The yaw rate YRt becomes a positive value when the vehicle 10 is turning left while advancing. The yaw rate YRt becomes a negative value when the vehicle 10 is turning right while advancing.

The GPS receiving section 46 determines the present position Pn of the vehicle 10 on the basis of signals (radio waves) from GPS (Global Positioning System) satellites (not shown) and outputs a signal representing the present position Pn to the DS ECU 20.

The map database 47 is composed of a hard disk drive (HDD) and stores map information. The map database 47 includes information (map information) regarding "nodes" such as intersections and dead ends and "links (roads)" which connect the nodes together. The information regarding links includes information representing the type of road (either of ordinary road and motorway (road for the exclusive use of cars)).

The input output device 48 is disposed on the dashboard of the vehicle 10. The input output device 48 includes a display unit (liquid crystal display). Characters, figures, etc. displayed on the display unit of the input output device 48 are controlled by the DS ECU 20. The display unit of the input output device 48 also functions as a touch panel. Accordingly, a driver can send instructions to the DS ECU 20 by touching the display unit.

The driver can switch the request state of driving assist control to be described later (specifically, follow-up vehicle-to-vehicle distance control, lane keeping control, and lane change assist control) between an ON state and an OFF state by his/her operation on the input output device 48.

The speakers 49 are respectively disposed inside the left and right front doors (not shown) of the vehicle 10 (within the vehicle compartment). The speakers 49 can produce sounds such as a warning sound and a voice message in accordance with instructions from the DS ECU 20.

The engine ECU 31 is connected to a plurality of engine sensors 61 and receives detection signals from these sensors. The engine sensors 61 detect the operation state quantities of the engine 62 which is a drive source of the vehicle 10. The engine sensors 61 include an accelerator pedal operation amount sensor, a throttle valve opening sensor, an engine speed sensor, an intake air amount sensor, etc.

Further, the engine ECU 31 is connected to engine actuators 63, such as a throttle valve actuator and a fuel injection valve, and a transmission 64. The engine ECU 31 changes the drive torque Tq generated by the engine 62 and the gear ratio of the transmission 64 by controlling the engine actuators 63 and the transmission 64. Thus, the engine ECU 31 adjusts the drive force of the vehicle 10, to thereby control the acceleration As.

The brake ECU 32 is connected to a plurality of brake sensors 65 and receives detection signals from these sensors. The brake sensors 65 detect parameters used for controlling an unillustrated "brake (hydraulic frictional brake) mounted on the vehicle 10." The brake sensors 65 include an operation amount sensor for detecting the operation amount of a brake pedal (not shown), wheel speed sensors for detecting the rotational speeds of the wheels, etc.

Further, the brake ECU 32 is connected to a brake actuator 66. The brake actuator 66 is a hydraulic control actuator. The brake actuator 66 is provided in a hydraulic circuit extending between a master cylinder which pressurizes hydraulic oil by using the depressing force applied to the brake pedal and the friction brake including well-known wheel cylinders provided in the wheels. The hydraulic circuit, the master cylinder, and the friction brake are not shown in the drawings. The brake actuator 66 controls the oil pressure supplied to the wheel cylinders. The brake ECU 32 generates brake forces (frictional brake forces) Bf applied to the wheels, by driving the brake actuator 66, so as to control the acceleration As (in this case, negative acceleration; namely, deceleration) of the vehicle 10.

The EPS ECU 33 is connected to a torque sensor 67 and a steering angle sensor 68 and receives detection signals from these sensors. The torque sensor 67 and the steering angle sensor 68 are disposed on a steering shaft (not shown) connected to a steering wheel 51. The torque sensor 67 outputs a signal representing steering torque Th which is applied to the steering wheel 51 by the driver. The steering angle sensor 68 outputs a signal representing steering angle θs which is the rotational angle of the steering wheel 51.

Further, the EPS ECU 33 is connected to a drive circuit 69. The drive circuit 69 supplies electric power to a motor 71. The motor 71 generates a motor torque Tm for rotating the steering shaft. In order to assist the steering operation of the steering wheel 51 by the driver, the EPS ECU 33 controls the drive circuit 69 such that the motor torque Tm becomes equal to "a target assist torque Tatgt determined on the basis of the steering torque Th, the steering angle θs, the vehicle speed Vs, etc." Further, the EPS ECU 33 changes the turn angle of unillustrated turnable wheels of the vehicle 10 by controlling the motor torque Tm in accordance with an instruction from the DS ECU 20.

The meter ECU 34 is connected to a combination display 72, a winker lever 52, left turn signal lamps 73a, and right turn signal lamps 73b.

The combination display 72 is a display unit (liquid crystal display) disposed in front of the driver. The meter ECU 34 displays the vehicle speed Vs, the rotational speed of the engine 62, etc. on the combination display 72.

The winker lever 52 is attached to a steering column 51a such that the winker lever 52 can be tilted (rotated) in the counterclockwise direction and the clockwise direction as viewed from the driver. The winker lever 52 has a detection section (not illustrated). The winker lever 52 (specifically, the detection section of the winker lever 52) detects the operation state of the winker lever 52 to be described later and outputs a signal corresponding to the detected operation state to the meter ECU 34.

When the winker lever 52 is tilted counterclockwise from the neutral position (initial position) by a predetermined angle to a first step position in the counterclockwise direction, the winker lever 52 outputs a signal representing that the operation state of the winker lever 52 is the first step position in the counterclockwise direction. When the winker lever 52 is further tilted counterclockwise from the first step position in the counterclockwise direction by a predetermined angle to a second step position in the counterclockwise direction, the winker lever 52 outputs a signal representing that the operation state of the winker lever 52 is the second step position in the counterclockwise direction.

When the winker lever 52 is tilted clockwise from the neutral position by a predetermined angle to a first step position in the clockwise direction, the winker lever 52 outputs a signal representing that the operation state of the winker lever 52 is the first step position in the clockwise direction. When the winker lever 52 is further tilted clockwise from the first step position in the clockwise direction by a predetermined angle to a second step position in the clockwise direction, the winker lever 52 outputs a signal representing that the operation state of the winker lever 52 is the second step position in the clockwise direction.

If the driver of the vehicle 10 stops the operation of the winker lever 52 (namely if the driver releases his/her hand from the winker lever 52) when the winker lever 52 is located at the first step position in the counterclockwise direction or the first step position in the clockwise direction as a result of the driver's operation, the winker lever 52 returns to the neutral position. Meanwhile, when the winker lever 52 reaches the second step position in the counterclockwise direction or the second step position in the clockwise direction as a result of the driver's operation, the winker lever 52 does not return to the neutral position even when the driver stops the operation.

When the driver applies a force to the winker lever 52 in the clockwise direction in a state in which the winker lever 52 is in the second step position in the counterclockwise direction, or when the steering wheel 51 rotates in the clockwise direction by a predetermined angle so as to return to the neutral position, the winker lever 52 returns to the neutral position. Similarly, when the driver applies a force to the winker lever 52 in the counterclockwise direction in a state in which the winker lever 52 is in the second step position in the clockwise direction, or when the steering wheel 51 rotates in the counterclockwise direction by a predetermined angle so as to return to the neutral position, the winker lever 52 returns to the neutral position (for example, see Japanese Patent Application Laid-Open (kokai) No. 2005-138647).

The left turn signal lamps 73a are winker lamps disposed at the left front corner and the left rear corner, respectively, of the vehicle 10. The right turn signal lamps 73b are winker lamps disposed at the right front corner and the right rear corner, respectively, of the vehicle 10.

When the winker lever 52 is located at the first step position in the counterclockwise direction or the second step position in the counterclockwise direction, the meter ECU 34 executes a leftward turn signal process. The leftward turn signal process includes a process of blinking the left turn signal lamps 73a at predetermined blinking time intervals and a process of blinking, at the blinking time intervals, a leftward arrow provided at a predetermined position of the combination display 72.

When the winker lever 52 is located at the first step position in the clockwise direction or the second step position in the clockwise direction, the meter ECU 34 executes a rightward turn signal process. The rightward turn signal process includes a process of blinking the right turn signal lamps 73b at the blinking time intervals and a process of blinking, at the blinking time intervals, a rightward arrow provided at a predetermined position of the combination display 72.

(Execution of Driving Assist Control)

As described above, the DS ECU 20 can execute driving assist controls (specifically, follow-up vehicle-to-vehicle distance control, lane keeping control, and lane change assist control) in accordance with a request from the driver. For executing these controls, the DS ECU 20 defines the X-Y coordinate system (see FIG. 1). The X axis extends in the longitudinal direction of the vehicle 10. The Y axis perpendicularly intersects with the X axis and extends in the lateral direction (width direction) of the vehicle 10. The origin of the X-Y coordinate system is located at the lateral center of the front end of the vehicle 10. The X coordinate assumes a positive value on the front side of the vehicle 10 with respect to the origin. The Y coordinate assumes a positive value on the left side of the vehicle 10 with respect to the origin.

First, there will be described processes (specifically, an own lane information obtainment process and a surrounding vehicle information obtainment process) for obtaining information regarding the surroundings of the vehicle 10 which is necessary for execution of the driving assist control.

(Own Lane Information Obtainment Process)

When the request state of the lane keeping control is in the ON state and when the request state of the lane change assist control is in the ON state, the DS ECU 20 executes the own lane information obtainment process. At the time of execution of the own lane information obtainment process, the DS ECU 20 obtains (recognizes) "a pair of lane separation lines (i.e., a right separation line and a left separation line) which define the own lane" contained in the front image received from the front camera 41.

After obtainment of the pair of lane separation lines, the DS ECU 20 obtains the curvature Cu of "a lane center line CL which is a set of lateral center points of the own lane extending in the forward direction of the vehicle 10." When the lane center line CL is a straight line, the curvature Cu becomes "0." When the lane center line CL curves leftward, the curvature Cu assumes a positive value. When the lane center line CL curves rightward, the curvature Cu assumes a negative value.

Figure 3:
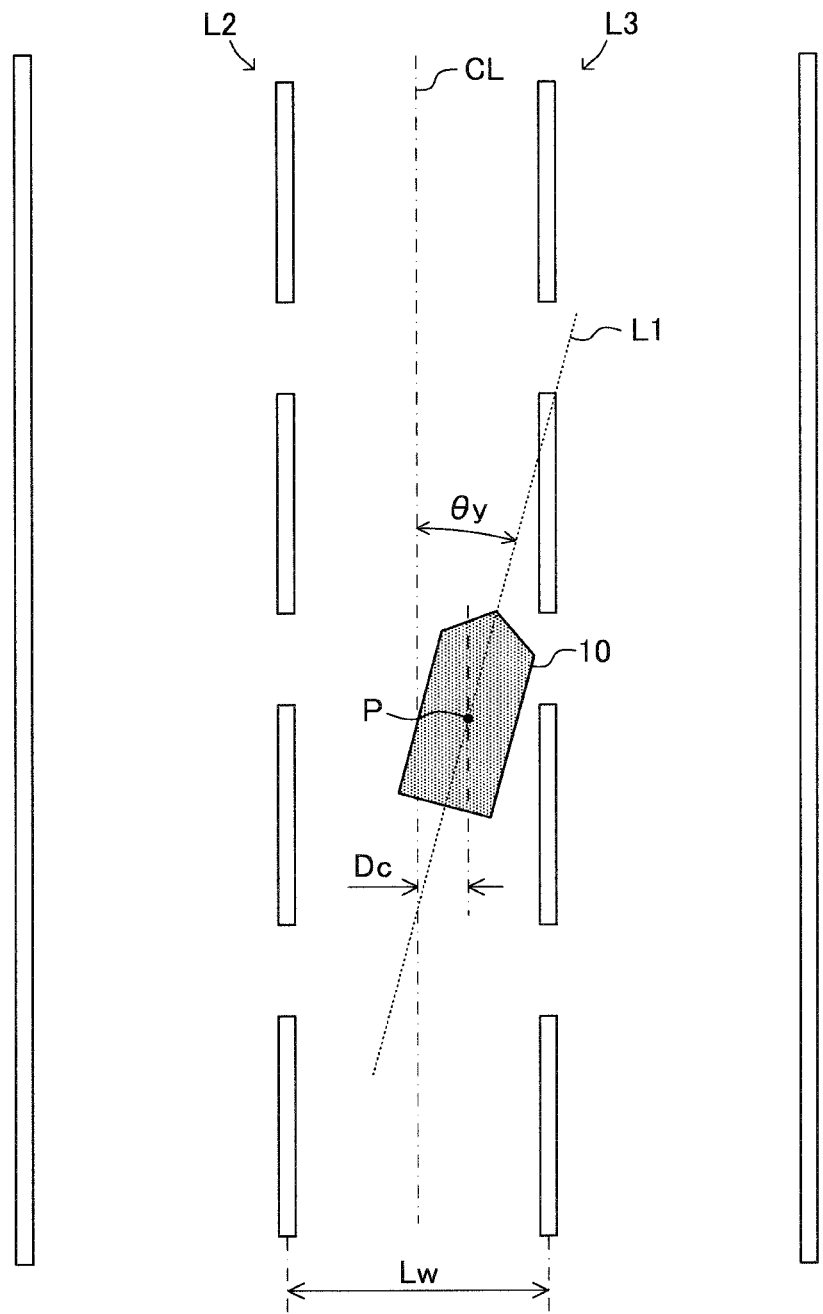
FIG. 3 is an illustration showing a portion of information obtained by an own lane information obtainment process.

In addition, when the DS ECU 20 obtains the yaw angle θy which is the angle between the heading direction of the vehicle 10 and the direction of the lane center line CL (in the case where the lane center line CL curves, the direction of a tangential line of the lane center line CL at the lateral center of the front end of the vehicle 10). As shown in FIG. 3, the yaw angle θy is an angle between the lane center line CL and a straight line L1 representing the longitudinal direction of the vehicle 10. When the vehicle 10 is in the state shown in FIG. 3, the yaw angle θy assumes a negative value.

Further, the DS ECU 20 determines the line type of each of the right separation line (lane marking, lane-partitioning line) and the left separation line, (specifically, determines whether each of the right separation line and the left separation line is a sold line (continuous line) or a broken line). In the example of FIG. 3, both the left separation line L2 and the right separation line L3 are broken lines.

In addition, the DS ECU 20 obtains a lane width Lw which is the width of the own lane measured in the lateral direction. Further, the DS ECU 20 obtains an own lane deviation Dc which is the deviation (signed distance) of the traveling position of the vehicle 10 (specifically, the position of the geometric centroid P of the outline of the vehicle 10 when the vehicle 10 is viewed from above) from the lateral center of the own lane. When the lateral center of the vehicle 10 is located on the left side of the lateral center of the own lane, the own lane deviation Dc assumes a positive value. When the lateral center of the vehicle 10 is located on the right side of the lateral center of the own lane, the own lane deviation Dc assumes a negative value. When the vehicle 10 is in the state shown in FIG. 3, the own lane deviation Dc assumes a negative value.

Notably, the front camera 41 may be configured such that an ECU (not illustrated) contained in the front camera 41 analyzes the front image every time a predetermined time elapses so as to obtain the curvature Cu, the yaw angle θy, the own lane deviation Dc, and the line type, and the ECU of the front camera 41 sends the obtained information to the DS ECU 20 every time a predetermined time elapses. Namely, the front camera 41 may execute the own lane information obtainment process.

(Surrounding Vehicle Information Obtainment Process)

When the request state of the follow-up vehicle-to-vehicle distance control is in the ON state and when the request state of the lane change assist control is in the ON state, the DS ECU 20 executes the surrounding vehicle information obtainment process. At the time of execution of the surrounding vehicle information obtainment process, for each of targets (n) present around the vehicle 10, the DS ECU 20 obtains the longitudinal position (the x coordinate of target (n)) Dx(n), the lateral position (the y coordinate of target (n)) Dy(n), the relative longitudinal speed Vx(n), and the relative lateral speed Vy(n) on the basis of the target information received from each of the radar units constituting the millimeter wave radar 42.

The relative longitudinal speed Vx(n) is a change in the longitudinal position Dx(n) per unit time. The relative lateral speed Vy(n) is a change in the lateral position Dy(n) per unit time. In the following description, the combination of these value regarding each target (n) will also be referred to as "collective target information." (n) is an identifier given to each of the targets. In the present embodiment, "n" is a natural number. In the case where the target information regarding the same target is detected by a plurality of radar units constituting the millimeter wave radar 42, the DS ECU 20 sums up these pieces of target information to thereby obtain a single piece of collective target information.

Further, the DS ECU 20 executes a straight line correction process of obtaining corrected target information which is collective target information for the case where the lane center line CL is assumed to be a straight line. By the straight line correction process, the DS ECU 20 obtains a corrected longitudinal position Dmx(n), a corrected lateral position Dmy(n), a corrected relative longitudinal speed Vmx(n), and a corrected relative lateral speed Vmy(n) of each target (n).

Figure 4:
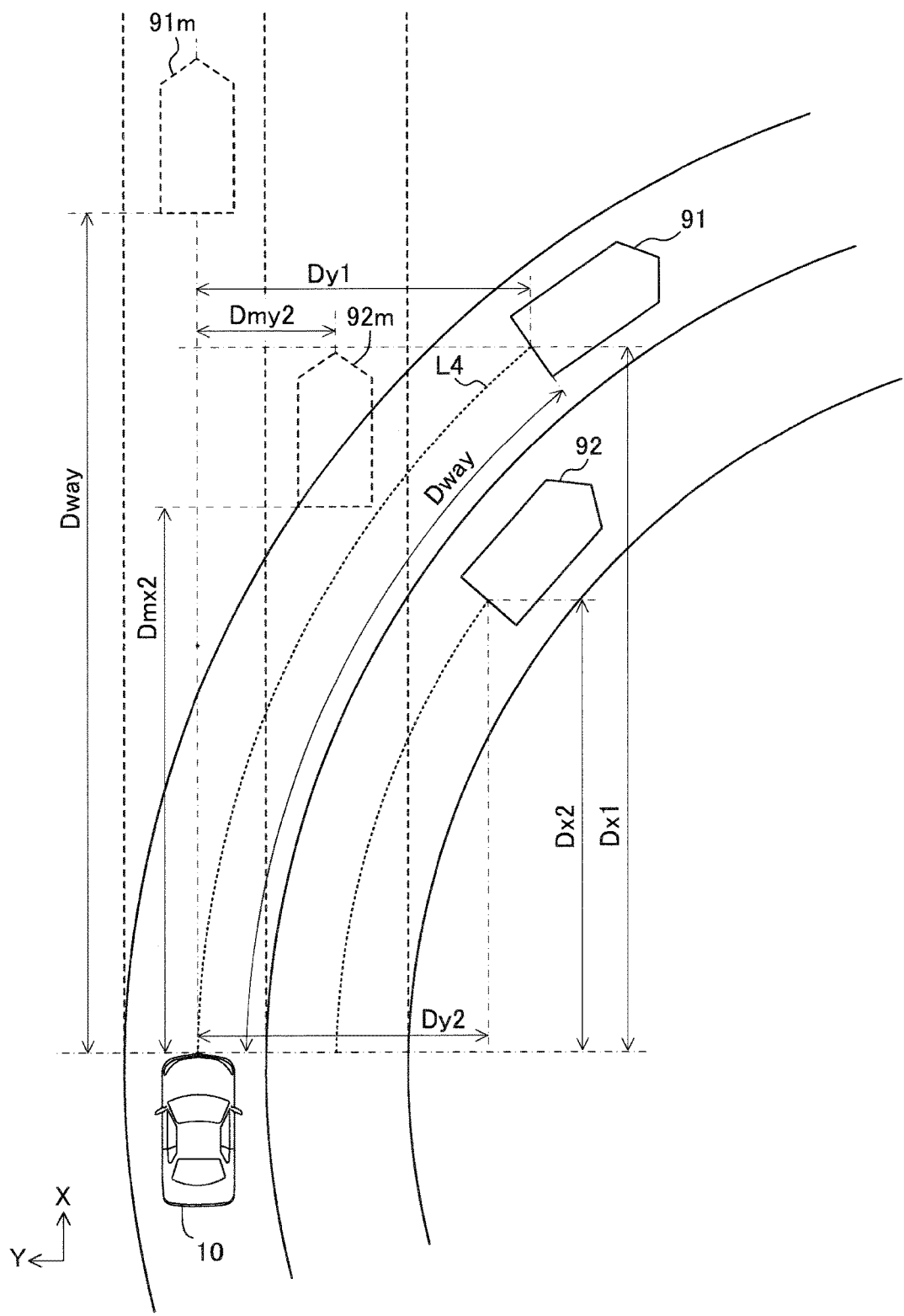
FIG. 4 is an illustration showing corrected positions obtained by a straight line correction process.

Specific operation will be described with reference to an example of FIG. 4. In FIG. 4, the vehicle 10 is traveling in a curved section which curves rightward. FIG. 4 shows another vehicle 91 traveling in the own lane (whose identifier in the collective target information is "91") and another vehicle 92 traveling in a lane located adjacent to and on the right side of the own lane (whose identifier in the collective target information is "92"). The traveling speed of the vehicle 91 is approximately equal to the vehicle speed Vs (namely, the traveling speed of the vehicle 10). The positions of the vehicle 91 and the vehicle 92 when these vehicles are assumed to travel in respective straight sections are shown as a corrected vehicle position 91m and a corrected vehicle position 92m, respectively.

The longitudinal position Dx(91) of the vehicle 91 in the collective target information is Dx1. Meanwhile, the distance from the present position of the vehicle 10 to the present position of the vehicle 91 (namely, the length of a traveling locus of the vehicle 91 indicated by a broken line L4) is Dway. In view of this, the DS ECU 20 estimates the distance Dway on the basis of the curvature Cu and sets the corrected longitudinal position Dmx (91) of the vehicle 91 to the distance Dway (not to the distance Dx1).

Similarly, the DS ECU 20 performs the straight line correction process for the lateral position Dy(91), the relative longitudinal speed Vx(91), and the relative lateral speed Vy(91). The lateral position Dy(91) of the vehicle 91 in the collective target information is Dy1. The corrected lateral position Dmy(91) is approximately "0." In addition, both the corrected relative longitudinal speed Vmx(91) and the corrected relative lateral speed Vmy(91) are approximately "0."

The DS ECU 20 executes the straight line correction process for the vehicle 92 as well. As can be understood from FIG. 4, the longitudinal position Dx(92) of the vehicle 92 in the collective target information is Dx2, and the lateral position Dy(92) of the vehicle 92 in the collective target information is Dy2. Meanwhile, the corrected longitudinal position Dmx(92) of the vehicle 92 is Dmx2, and the corrected lateral position Dmy(92) of the vehicle 92 is Dmy2.

Further, the DS ECU 20 determines whether each of the targets (n) is "an own lane other vehicle," "a left lane other vehicle," or "a right lane other vehicle." The own lane other vehicle is another vehicle traveling in the own lane. The left lane other vehicle is another vehicle traveling in the left lane which is a lane located adjacent to and on the left side of the own lane. The right lane other vehicle is another vehicle traveling in the right lane which is a lane located adjacent to and on the right side of the own lane.

(Surrounding Vehicle Information Obtainment Process—Own Lane Other Vehicle)

In order to determine whether or not the target (n) is an own lane other vehicle, the DS ECU 20 obtains (updates) the post-smoothing own lane probability POs(n) of the target (n) every time a predetermined time Δt elapses. When the post-smoothing own lane probability POs is greater than a predetermined probability threshold Pth (namely, POs(n)>Pth), the DS ECU 20 determines that the target (n) is an own lane other vehicle.

A method of obtaining the post-smoothing own lane probability POs(n) will be described. Every time the predetermined time Δt elapses, the DS ECU 20 executes "an own lane presence probability obtainment process" of obtaining the own lane presence probability POi(n) of the target (n). The DS ECU 20 obtains the post-smoothing own lane probability POs(n) by smoothing a change in the own lane presence probability POi(n) with time by a method which will be described later.

Figure 5:
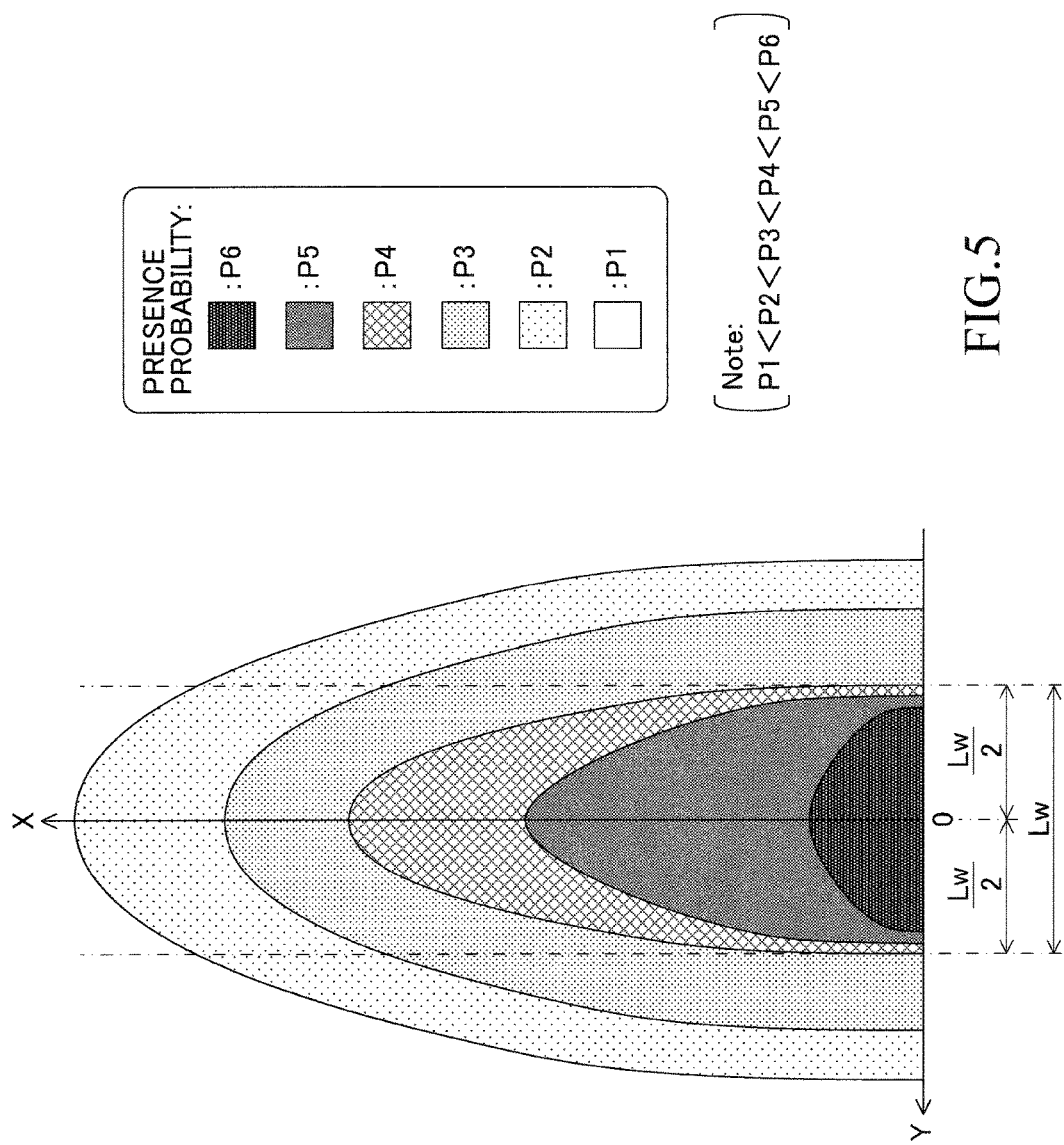
FIG. 5 is an illustration showing a lane probability map.

The DS ECU 20 obtains the own lane presence probability POi(n) by applying an applied longitudinal position Dax(n) and an own lane lateral position DOy(n) of the target (n) to the longitudinal axis X and the lateral axis Y, respectively, of "the lane probability map" shown in FIG. 5. In the lane probability map, in general, the smaller the value of the longitudinal axis X, the higher the presence probability, and the smaller the value of the lateral axis Y, the higher the presence probability. The lane probability map is line symmetry with respect to the longitudinal axis X. The lane probability map is defined such that its longitudinal axis X coincides with the lane center line CL of the own lane, its lateral axis Y coincides with the lane width direction, and the 0 point (origin) of the longitudinal axis X coincides with the front end of the vehicle 10. The lane probability map defines the instantaneous presence probability of another vehicle in each region on the map.

The relation between presence probability and the combination of the values of the longitudinal axis X and the lateral axis Y represented in the lane probability map shown in FIG. 5 is stored in the ROM of the DS ECU 20 in the form of a lookup table. Notably, the DS ECU 20 uses the lane probability map while expanding and contracting the lane probability map in the Y-axis direction in accordance with the actual lane width Lw obtained.

The applied longitudinal position Dax(n) is the value obtained by converting the X coordinate of the target (n) in the X-Y coordinate system of the vehicle 10 to its X coordinate in the X-Y coordinate system of the lane probability map. Specifically, when the value of the corrected longitudinal position Dmx(n) is equal to or greater than "0," the DS ECU 20 sets the applied longitudinal position Dax(n) to a value equal to the corrected longitudinal position Dmx(n) (namely, Dax(n) Dmx(n)). Meanwhile, when the value of the corrected longitudinal position Dmx(n) is negative and its magnitude |Dmx(n)| is equal to or less than the vehicle length of the vehicle 10 (length in the longitudinal direction) Lc, the DS ECU 20 sets the applied longitudinal position Dax(n) to "0" (namely, Dax(n)←0).

Further, when the value of the corrected longitudinal position Dmx(n) is negative and its magnitude |Dmx(n)| is greater than the vehicle length Lc, the DS ECU 20 sets the applied longitudinal position Dax(n) to a value obtained by subtracting the vehicle length Lc from the magnitude |Dmx(n)| of the corrected longitudinal position Dmx(n) (namely, Dax(n)←−Dmx(n)−Lc).

Next, a method of obtaining the own lane lateral position DOy(n) will be described. The own lane lateral position DOy(n) is the deviation (signed distance) in the lateral direction of the position of the target (n), obtained by the straight line correction process, from the lateral center of the own lane.

Namely, the own lane lateral position DOy(n) is the value obtained by converting the Y coordinate of the target (n) in the X-Y coordinate system of the vehicle 10 to its Y coordinate in the X-Y coordinate system of the lane probability map. Specifically, the DS ECU 20 calculates the own lane lateral position DOy(n) as the sum of the corrected lateral position Dmy(n) and the own lane deviation Dc (namely, DOy(n)←Dmy(n)+Dc). As a result, when the target (n) is located at the lateral center of the own lane (namely, the target (n) is located on the lane center line CL), the own lane lateral position DOy(n) becomes "0." Meanwhile, when the target (n) is located on the left side of the lane center line CL, the value of the own lane lateral position DOy(n) becomes positive. When the target (n) is located on the right side of the lane center line CL, the value of the own lane lateral position DOy(n) becomes negative.

As described above, after having obtained the own lane presence probability POi(n), the DS ECU 20 obtains the post-smoothing own lane probability POs(n) by smoothing the time course change in the own lane presence probability POi(n). More specifically, the DS ECU 20 obtains the post-smoothing own lane probability POs(n) in accordance with the following Equation (1). In Equation (1), a previous post-smoothing own lane probability POp(n) is the post-smoothing own lane probability POs(n) calculated in accordance with Equation (1) in the own lane presence probability obtainment process executed the predetermined time Δt ago. W is a predetermined weighting factor (0<W<1).

$$POs(n)=POp(n)\cdot W+POi(n)\cdot(1-W) \qquad (1)$$

(Surrounding Vehicle Information Obtainment Process—Left Lane Other Vehicle)

In order to determine whether or not the target (n) is a left lane other vehicle, the DS ECU 20 obtains (updates) the post-smoothing left lane probability PLs(n) of the target (n) every time the predetermined time Δt elapses. When the post-smoothing left lane probability PLs(n) is greater than the probability threshold Pth (namely, PLs(n)>Pth), the DS ECU 20 determines that the target (n) is a left lane other vehicle.

The DS ECU 20 obtains the left lane presence probability PLi(n) of the target (n) by applying the applied longitudinal position Dax(n) and the left lane lateral position DLy(n) of the target (n) to the lane probability map of FIG. 5. The process of obtaining the left lane presence probability PLi(n) will also be referred to as "a left lane presence probability obtainment process." The left lane lateral position DLy(n) is the deviation (signed distance) in the lateral direction of the position of the target (n), obtained by the straight line correction process, from the lateral center of the left lane.

Namely, the left lane lateral position DLy(n) is obtained as follows. The lane probability map is converted to a map (map for left lane) which defines the probability that the target (n) is present in the left lane, and the left lane lateral position DLy(n) is obtained by converting the Y coordinate of the target (n) in the X-Y coordinate system of the vehicle 10 to its Y coordinate in the X-Y coordinate system of the map for left lane. Specifically, the DS ECU 20 calculates the left lane lateral position DLy(n) as the sum of a value obtained by multiplying the lane width Lw by "−1," the corrected lateral position Dmy(n), and the own lane deviation Dc (namely, DLy(n)←−Lw+Dmy(n)+Dc).

As a result, when the target (n) is located at the lateral center of the left lane, the left lane lateral position DLy(n) becomes "0." When the target (n) is located on the left side of the lateral center of the left lane, the value of the left lane lateral position DLy(n) becomes positive. When the target (n) is located on the right side of the lateral center of the left lane, the value of the left lane lateral position DLy(n) becomes negative.

The DS ECU 20 obtains the post-smoothing left lane probability PLs(n) by smoothing the left lane presence probability PLi(n) in accordance with the following Equation (2). In Equation (2), a previous post-smoothing left lane probability PLp(n) is the post-smoothing left lane probability PLs(n) calculated in accordance with Equation (2) in the left lane presence probability obtainment process executed the predetermined time Δt ago. W is a predetermined weighting factor (0<W<1).

$$PLs(n)=PLp(n)\cdot W+PLi(n)\cdot(1-W) \qquad (2)$$

(Surrounding Vehicle Information Obtainment Process—Right Lane Other Vehicle)

In order to determine whether or not the target (n) is a right lane other vehicle, the DS ECU 20 obtains (updates) the post-smoothing right lane probability PRs(n) of the target (n) every time the predetermined time Δt elapses. When the post-smoothing right lane probability PRs(n) is greater than the probability threshold Pth (namely, PRs(n)>Pth), the DS ECU 20 determines that the target (n) is a right lane other vehicle.

The DS ECU 20 obtains the right lane presence probability PRi(n) of the target (n) by applying the applied longitudinal position Dax(n) and the right lane lateral position DRy(n) of the target (n) to the lane probability map of FIG. 5. The process of obtaining the right lane presence probability PRi(n) will also be referred to as "a right lane presence probability obtainment process." The right lane lateral position DRy(n) is the deviation (signed distance) in the lateral direction of the position of the target (n), obtained by the straight line correction process, from the lateral center of the right lane.

Namely, the right lane lateral position DRy(n) is obtained as follows. The lane probability map is converted to a map (map for right lane) which defines the probability that the target (n) is present in the right lane, and the right lane lateral position DRy(n) is obtained by converting the Y coordinate of the target (n) in the X-Y coordinate system of the vehicle 10 to its Y coordinate in the X-Y coordinate system of the map for right lane. Specifically, the DS ECU 20 calculates the right lane lateral position DRy(n) as the sum of the lane width Lw, the corrected lateral position Dmy(n), and the own lane deviation Dc (namely, DRy(n)←Lw+Dmy(n)+Dc).

As a result, when the target (n) is located at the lateral center of the right lane, the right lane lateral position DRy(n) becomes "0." When the target (n) is located on the left side of the lateral center of the right lane, the value of the right lane lateral position DRy(n) becomes positive. When the target (n) is located on the right side of the lateral center of the right lane, the value of the right lane lateral position DRy(n) becomes negative.

The DS ECU 20 obtains the post-smoothing right lane probability PRs(n) by smoothing the right lane presence probability PRi(n) in accordance with the following Equation (3). In Equation (3), a previous post-smoothing right lane probability PRp(n) is the post-smoothing right lane probability PRs(n) calculated in accordance with Equation (3) in the right lane presence probability obtainment process executed the predetermined time Δt ago. W is a predetermined weighting factor (0<W<1).

$$PRs(n)=PRp(n)\cdot W+PRi(n)\cdot(1-W) \qquad (3)$$

(Surrounding Vehicle Information Obtainment Process—Examples of Changes in Presence Probability and Post-Smoothing Probability)

Figure 6:
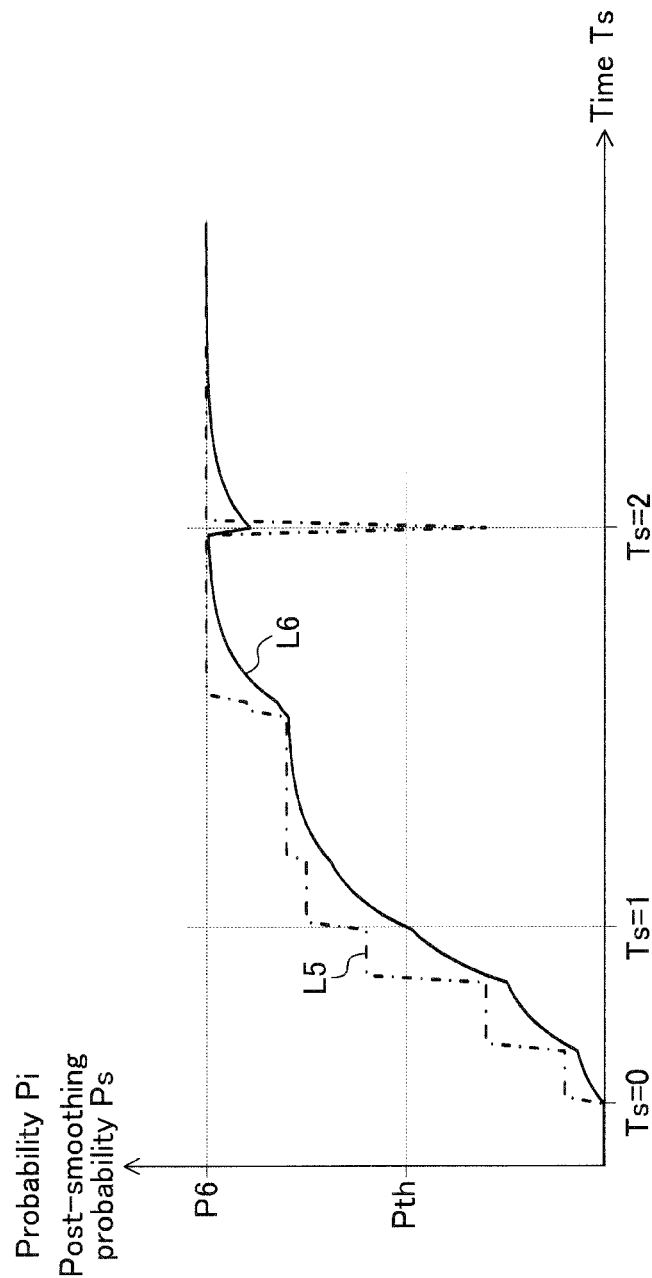
FIG. 6 is a graph showing examples of changes in probability obtained from the lane probability map and changes in post-smoothing probability.

FIG. 6 shows changes in the left lane presence probability PLi(n) and the post-smoothing left lane probability PLs(n). A chain line L5 of FIG. 6 shows a change with time Ts in the left lane presence probability PLi(n) regarding the left lane other vehicle. A continuous line L6 of FIG. 6 shows a change with time Ts in the post-smoothing left lane probability PLs(n) regarding the left lane other vehicle.

As can be understood from FIG. 6, the left lane presence probability PLi(n) starts to increase at the point when Ts=0. Namely, after the point when time Ts=0, the magnitude

|Dx(n)| of the longitudinal position Dx(n) of that another vehicle traveling in the left lane decreases.

Meanwhile, the post-smoothing left lane probability PLs(n) increases with a slight delay with respect to the left lane presence probability PLi(n). At the point when time Ts=1, the post-smoothing left lane probability PLs(n) becomes equal to the probability threshold Pth.

At the point when time Ts=2, since the acquisition error of the target information regarding that another vehicle increases temporarily, the left lane presence probability PLi(n) becomes smaller than the probability threshold Pth temporarily. Meanwhile, the post-smoothing left lane probability PLs(n) maintains a value higher than the probability threshold Pth even in the vicinity of the point when time Ts=2.

This example shows that, by comparing the post-smoothing left lane probability PLs(n) and the probability threshold Pth, it is possible to increase the possibility that the determination as to whether or not the target (n) is a left lane other vehicle can be made properly even when the left lane presence probability PLi(n) changes temporarily as a result of a temporary increase in the acquisition error of the target information. Similarly, by comparing the post-smoothing own lane probability POs(n) and the probability threshold Pth, it is possible to increase the possibility that the determination as to whether or not the target (n) is an own lane other vehicle can be made properly even when the own lane presence probability POi(n) changes temporarily as a result of a temporary increase in the acquisition error of the target information. In addition, by comparing the post-smoothing right lane probability PRs(n) and the probability threshold Pth, it is possible to increase the possibility that the determination as to whether or not the target (n) is a right lane other vehicle can be made properly even when the right lane presence probability PRi(n) changes temporarily as a result of a temporary increase in the acquisition error of the target information.

(Surrounding Vehicle Information Obtainment Process—Offset Process)

Incidentally, in the middle of a lane change of the vehicle 10 from the own lane (original lane) to a lane (target lane) adjacent to the own lane, there occurs "an own lane switching" in which "the lane recognized as the own lane by the own lane information obtainment process" switches from the original lane to the target lane. For example, when a lane change from the own lane (original lane) to a left lane (target lane) (namely, a leftward lane change) is performed by the lane change assist control which will be described later, the own lane deviation Dc increases gradually and becomes equal to a half of the lane width Lw (namely, Dc=Lw/2) at a certain timing. At that time, the lateral center of the vehicle 10 (specifically, the geometric centroid P of the vehicle 10) is located on the left-hand-side separation line of the own lane (original lane).

After that, when the state in which the own lane deviation Dc is greater than a half of the lane width Lw by a predetermined amount continues for a predetermined time, there occurs own lane switching in which the DS ECU 20 recognizes, as a new own lane, the lane having been recognized as the left lane (target lane in this case). Notably, even in the case where the front camera 41 executes the own lane information obtainment process, own lane switching occurs similarly.

When such own lane switching occurs, the own lane deviation Dc obtained by the own lane information obtainment process becomes the deviation of the traveling position of the vehicle 10 from the lateral center of the new own lane (target lane). In other words, at the time execution of the lane change assist control for the lane change to the left lane, the own lane deviation Dc decreases from the value of Lw/2 to the value of −Lw/2 by the lane width Lw because of occurrence of the own lane switching.

In view of the foregoing, during a period between occurrence of own lane switching as a result of execution of the lane change assist control for the case where the target lane is a left lane and completion of the lane change assist control (hereinafter referred to as "a leftward lane change assist latter period"), the DS ECU 20 operates as follows in the own lane presence probability obtainment process, the left lane presence probability obtainment process, and the right lane presence probability obtainment process.

Namely, in the own lane presence probability obtainment process in the leftward lane change assist latter period, the DS ECU 20 obtains the own lane presence probability POi(n) by applying to the lane probability map of FIG. 5 the applied longitudinal position Dax(n) of the target (n) and a value obtained by adding the lane width Lw to the own lane lateral position DOy(n).

In addition, in the left lane presence probability obtainment process in the leftward lane change assist latter period, the DS ECU 20 obtains the left lane presence probability PLi(n) by applying to the lane probability map of FIG. 5 the applied longitudinal position Dax(n) of the target (n) and a value obtained by adding the lane width Lw to the left lane lateral position DLy(n).

Further, in the right lane presence probability obtainment process in the leftward lane change assist latter period, the DS ECU 20 obtains the right lane presence probability PRi(n) by applying to the lane probability map of FIG. 5 the applied longitudinal position Dax(n) of the target (n) and a value obtained by adding the lane width Lw to the right lane lateral position DRy(n).

Namely, in the leftward lane change assist latter period, the DS ECU 20 offsets each of "the own lane lateral position DOy(n), the left lane lateral position DLy(n), and the right lane lateral position DRy(n)" applied to the lane probability map of FIG. 5 by the lane width Lw. This process will also be referred to as "a leftward offset process."

Meanwhile, when a lane change from the own lane (original lane) to a right lane (target lane) (namely, a rightward lane change) is performed by the lane change assist control, the own lane deviation Dc decreases gradually and, at a certain timing, becomes equal to a half of a value obtained by multiplying the lane width Lw by "−1" (namely, Dc=−Lw/2). At that time, the lateral center of the vehicle 10 is located on the right-hand-side separation line of the own lane (original lane).

After that, when the state in which the own lane deviation Dc is smaller than a half of the value obtained by multiplying the lane width Lw by "−1" by a predetermined amount (namely, the state in which the magnitude |Dc| of the own lane deviation Dc is greater than Lw/2 by the predetermined amount) continues for a predetermined time, there occurs own lane switching in which the DS ECU 20 recognizes, as a new own lane, the lane having been recognized as the right lane (target lane in this case). Notably, even in the case where the front camera 41 executes the own lane information obtainment process, own lane switching occurs similarly.

When such own lane switching occurs, the own lane deviation Dc obtained by the own lane information obtainment process becomes the deviation of the traveling position of the vehicle 10 from the lateral center of the new own lane (target lane). In other words, at the time execution of the lane change assist control for the lane change to the right lane, the own lane deviation Dc increases from the value of −Lw/2 to the value of Lw/2 by the lane width Lw because of occurrence of the own lane switching.

In view of the foregoing, during a period between occurrence of own lane switching as a result of execution of the lane change assist control for the case where the target lane is a right lane and completion of the lane change assist control (hereinafter referred to as "a rightward lane change assist latter period"), the DS ECU 20 operates as follows in the own lane presence probability obtainment process, the left lane presence probability obtainment process, and the right lane presence probability obtainment process.

Namely, in the own lane presence probability obtainment process in the rightward lane change assist latter period, the DS ECU 20 obtains the own lane presence probability POi(n) by applying to the lane probability map of FIG. 5 the applied longitudinal position Dax(n) of the target (n) and a value obtained by subtracting the lane width Lw from the own lane lateral position DOy(n).

In addition, in the left lane presence probability obtainment process in the rightward lane change assist latter period, the DS ECU 20 obtains the left lane presence probability PLi(n) by applying to the lane probability map of FIG. 5 the applied longitudinal position Dax(n) of the target (n) and a value obtained by subtracting the lane width Lw from the left lane lateral position DLy(n).

Further, in the right lane presence probability obtainment process in the rightward lane change assist latter period, the DS ECU 20 obtains the right lane presence probability PRi(n) by applying to the lane probability map of FIG. 5 the applied longitudinal position Dax(n) of the target (n) and a value obtained by subtracting the lane width Lw from the right lane lateral position DRy(n).

Namely, in the rightward lane change assist latter period, the DS ECU 20 offsets each of "the own lane lateral position DOy(n), the left lane lateral position DLy(n), and the right lane lateral position DRy(n)" applied to the lane probability map of FIG. 5 by the lane width Lw. This process will also be referred to as "a rightward offset process."

(Follow-Up Vehicle-to-Vehicle Distance Control (ACC))

The driving assist controls executed by the DS ECU 20 will now be described. The follow-up vehicle-to-vehicle distance control (one of the driving assist controls) is a control which specifies, as a vehicle to follow, another vehicle which is traveling just in front of the vehicle 10 in the own lane, sets a target acceleration Actgt such that the distance between the vehicle 10 and the vehicle to follow becomes equal to a target vehicle-to-vehicle distance Dtgt, and renders the actual acceleration As equal to the target acceleration Actgt.

Since such follow-up vehicle-to-vehicle distance control is well known (see, for example, Japanese Patent Application Laid-Open (kokai) Nos. 2014-148293 and 2006-315491 and Japanese Patent Nos. 4172434 and 4929777), the follow-up vehicle-to-vehicle distance control will be described only briefly. The follow-up vehicle-to-vehicle distance control is also called "adaptive cruise control (ACC)."

In the case where the request state of the follow-up vehicle-to-vehicle distance control is in the ON state, the DS ECU 20 executes the follow-up vehicle-to-vehicle distance control. The target vehicle-to-vehicle distance Dtgt is set (selected) by an operation "performed on the input output device 48 by the driver."

The DS ECU 20 specifies (selects) a target (n) traveling just in front of the vehicle 10 among targets (n) each of which is determined to be an own lane other vehicle by the above-described surrounding vehicle information obtainment process. If the corrected longitudinal position Dmx(n) of the target (n) traveling just in front of the vehicle 10 is smaller than a predetermined distance threshold Dth, the DS ECU 20 determines that the target (n) is the vehicle to follow. The DS ECU 20 obtains the target acceleration Actgt of the vehicle 10 such that the distance between the vehicle 10 and the vehicle to follow becomes equal to the target vehicle-to-vehicle distance Dtgt, and controls the acceleration As by sending request signals to the engine ECU 31 and the brake ECU 32 such that the actual acceleration As coincides with the target acceleration Actgt.

(Lane Keeping Control (LKA, LTC))

Lane keeping control is a control for assisting the vehicle 10 to travel within the own lane; specifically, a control which determines a lane keeping path Ld and controls the torque Tm so as to control the steering angle θs such that the vehicle 10 travels along the lane keeping path Ld.

Since lane keeping control is well known (see, for example, Japanese Patent Application Laid-Open (kokai) Nos. 2008-195402, 2009-190464, and 2010-6279 and Japanese Patent No. 4349210), the lane keeping control will be described only briefly. The lane keeping control is also called "lane keeping assist (LKA)" or "lane trace control (LTC)."

When the follow-up vehicle-to-vehicle distance control is being executed and the request state of the lane keeping control is in the ON state, the DS ECU 20 executes the lane keeping control. At the time of execution of the lane keeping control, the DS ECU 20 uses the lane center line CL of the own lane as the lane keeping path Ld. Accordingly, the curvature of the lane keeping path Ld coincides with the curvature of the lane center line CL. The deviation of the vehicle 10 from the lane keeping path Ld in the horizontal direction coincides with the own lane deviation Dc. The angle between the lane keeping path Ld and the heading direction of the vehicle 10 coincides with the yaw angle θy.

In view of the foregoing, the DS ECU 20 computes a target steering angle θlta* in accordance with the following Equation (4). In Equation (4), Klta1, Klta2, Klta3, and Klta4 are control gains, and an integral value ΣDc is an integrated value of the own lane deviation Dc with time.

$$\theta lta^* = Klta1 \cdot Cu + Klta2 \cdot \theta y + Klta3 \cdot Dc + Klta4 \cdot \Sigma Dc \quad (4)$$

The DS ECU 20 sends a request signal to the EPS ECU 33 such that the actual steering angle θs coincides with the target steering angle θlta*. As a result, the motor 71 is controlled through the drive circuit 69 such that the actual steering angle θs coincides with the target steering angle θlta*.

(Lane Change Assist Control (LCS))

Lane change assist control is a control for assisting the lane change from the own lane to "a target lane adjacent to the own lane (namely, either of the left lane or the right lane)"; specifically, a control which determines a lane change path Lt extending from the own lane to the target lane as will be described later, and controls the steering angle θs such that the vehicle 10 travels along the lane change path Lt. Such lane change assist control is also called "lane change support (LCS)."

When "predetermined LCS start conditions that the follow-up vehicle-to-vehicle distance control and the lane keeping control are being executed, the request state of the lane change assist control is in the ON state, and lane change assist is requested by the driver" are satisfied, the DS ECU 20 executes (starts) the lane change assist control instead of the lane keeping control. The LCS start conditions will be described later.

When the state in which the winker lever 52 is located at the first step position in the counterclockwise direction continues beyond a predetermined support request confirmation time Tr (0.8 sec in the present embodiment), the DS ECU 20 determines that there is a lane change support request in which the left lane is selected as the target lane. Similarly, when the state in which the winker lever 52 is located at the first step position in the clockwise direction continues beyond the predetermined support request confirmation time Tr, the DS ECU 20 determines that there is a lane change support request in which the right lane is selected as the target lane.

At the time of start of the lane change assist control, the DS ECU 20 informs the driver of the acceptance of the lane change support request by causing the speakers 49 to produce a sound for a short period of time. In addition, when the DS ECU 20 executes the lane change assist control while selecting the left lane as the target lane, the DS ECU 20 continues the leftward turn signal process even when the winker lever 52 is located at the neutral position. Meanwhile, when the DS ECU 20 executes the lane change assist control while selecting the right lane as the target lane, the DS ECU 20 continues the rightward turn signal process even when the winker lever 52 is located at the neutral position.
(Lane Change Assist Control—Determination of Lane Change Path)

A method of determining the lane change path Lt will be described. The lane change path Lt is a target travel path of the vehicle 10 extending from the position of the vehicle 10 at the time of start of the lane change to the position of the lateral center of the target lane.

The DS ECU 20 determines the lane change path Lt such that the time from the start of the lane change to the end of the lane change becomes equal to a target lane change time TL. The position of the lateral center of the target lane will also referred to as "a final target lateral position." The lane change path Lt is represented by the target lateral position y(t) of the vehicle 10, with the lane center line CL of the original lane serving as a reference, the target lateral position y(t) being a function of time t elapsed from the point when the lane change assist control has been started (hereinafter referred to as "the lane change assist control start time").

The DS ECU 20 obtains (calculates) the target lateral position y(t) on the lane change path Lt in accordance with the following Equation (5). The target lateral position y is a quintic function of the elapsed time t. The target lateral position y(t) is also expressed as "a target lateral position function y(t)."

$$y(t) = a \cdot t^5 + b \cdot t^4 + c \cdot t^3 + d \cdot t^2 + e \cdot t + f \quad (5)$$

"Coefficients a, b, c, d, e, and f" in Equation (5) are determined on the basis of the traveling state of the vehicle 10, the line information, and the target lane change time TL at the time of computation of the lane change path Lt. The DS ECU 20 obtains the coefficients a, b, c, d, e, and f which make the lane change path Lt smooth by applying the traveling state of the vehicle 10, the line information, and the target lane change time TL to a vehicle model (lookup table) stored in the ROM in advance.

The DS ECU 20 calculates the target lateral position (specifically, the moving amount in the lateral direction from the lateral center of the original lane) at the elapsed time t from the lane change assist control start time. The DS ECU 20 then computes a target steering angle θlca* such that the position of the vehicle 10 in the horizontal direction coincides with the target lateral position, and sends a request signal to the EPS ECU 33 such that the actual steering angle θs coincides with the target steering angle θlca*. As a result, the motor 71 is controlled through the drive circuit 69, such that the actual steering angle θs coincides with the target steering angle θlca*.
(Lane Change Assist Control—LCS Start Conditions)

The LCS start conditions are satisfied when all the following conditions (S1) to (S8) are satisfied.
(S1) The follow-up vehicle-to-vehicle distance control and the lane keeping control are being executed.
(S2) The road on which the vehicle 10 is traveling is a motorway.
(S3) The line type of the lane separation line (boundary line) which defines the boundary between the original lane and the target lane is "broken line."
(S4) The vehicle speed Vs falls within a predetermined speed range.
(S5) It has been determined that when the lane change is executed, the vehicle 10 does not collide with another vehicle traveling in the target lane.
(S6) The request state of the lane change assist control is in the ON state.
(S7) The driver of the vehicle 10 requests the lane change assist.
(S8) An LCS execution prohibition condition is not satisfied.

The DS ECU 20 determines whether or not the condition (S2) is satisfied by applying the present position Pn to the map information stored in the map database 47. In addition, the DS ECU 20 determines whether or not the line type of the boundary line is "broken line" on the basis of the line type obtained by the own lane information obtainment process.

The condition (S5) will be described specifically. In order to determine whether or not the condition (S5) is satisfied, the DS ECU 20 specifies a target lane front vehicle (a) and a target lane rear vehicle (b). (a) is the identifier of a target (n) specified as the target lane front vehicle. (b) is the identifier of a target (n) specified as the target lane rear vehicle. Accordingly, "a" and "b" are natural numbers.

The target lane front vehicle (a) is the vehicle closest to the vehicle 10 among other vehicles in the target lane which travel ahead of the vehicle 10. If the corrected longitudinal position Dmx(n) of a certain target (n) assumes a positive value, the DS ECU 20 determines that that target (n) is traveling ahead of the vehicle 10. Accordingly, the target lane front vehicle (a) is a target which is one of the targets (n) (other vehicles traveling in the target lane) and whose corrected longitudinal position Dmx(n) assumes a positive value and which is the smallest in the corrected longitudinal position Dmx(n).

Meanwhile, the target lane rear vehicle (b) is the vehicle closest to the vehicle 10 among other vehicles in the target lane which travel behind the vehicle 10. If the corrected longitudinal position Dmx(n) of a certain target (n) assumes "0" or a negative value, the DS ECU 20 determines that that target (n) is traveling behind the vehicle 10. Accordingly, the target lane rear vehicle (b) is a target which is one of the targets (n) (other vehicles traveling in the target lane) and whose corrected longitudinal position Dmx(n) assumes a value equal to or less than 0 and which is the smallest in the magnitude |Dmx(n)| of the corrected longitudinal position Dmx(n).

After having specified the target lane front vehicle (a), the DS ECU 20 calculates a forward collision time Tcf which is a time elapsing until the vehicle 10 collides with the target lane front vehicle (a). The DS ECU 20 calculates the forward collision time Tcf by multiplying, by "−1", a value obtained by dividing the corrected longitudinal position Dmx(a) of the target lane front vehicle (a) by a corrected relative longitudinal speed Vmx(a) of the target lane front vehicle (a) (namely, Tcf=−Dmx(a)/Vmx(a)). Further, when the forward collision time Tcf is greater than a predetermined positive collision time threshold Tcth or a negative value (Tcf>Tcth, or Tcf<0), the DS ECU 20 determines that when the lane change is executed, the vehicle 10 does not collide with the target lane front vehicle (a).

Meanwhile, after having specified the target lane rear vehicle (b), the DS ECU 20 calculates a rearward collision time Tcr which is a time elapsing until the vehicle 10 collides with the target lane rear vehicle (b). The DS ECU 20 calculates the rearward collision time Tcr by dividing the corrected longitudinal position Dmx(b) of the target lane rear vehicle (b) by a corrected relative longitudinal speed Vmx(b) of the target lane rear vehicle (b) (namely, Tcr=Dmx(b)/Vmx(b)). Further, when the rearward collision time Tcr is greater than the collision time threshold Tcth or a negative value (Tcr>Tcth, or Tcr<0), the DS ECU 20 determines that when the lane change is executed, the vehicle 10 does not collide with the target lane rear vehicle (b).

The DS ECU 20 determines that the condition (S5) is satisfied if both the following conditions (sa) and (sb) are satisfied.
(sa) The target lane front vehicle (a) is not present, or it has been determined that the vehicle 10 does not collide with the target lane front vehicle (a).
(sb) The target lane rear vehicle (b) is not present, or it has been determined that the vehicle 10 does not collide with the target lane rear vehicle (b).

Next, the condition (S8) will be described specifically. The DS ECU 20 determines that the LCS execution prohibition condition is satisfied if both the following conditions (pa) and (pb) are satisfied. In other words, the condition (S8) is satisfied if one of or both the conditions (pa) and (pb) are not satisfied.
(pa) The direction of the lane change (namely, the leftward or rightward lane change) for which the driver requests the lane change assist is the same as the direction of the lane change for which the lane change assist was performed by the lane change assist control executed last time.
(pb) A period of time longer than a predetermined re-change prohibition time Tint has elapsed from the end of the lane change assist control executed last time to the present point in time.

(Lane Change Assist Control—LCS Completion Condition)

When an LCS completion condition is satisfied during execution of the lane change assist control, the DS ECU 20 ends the lane change assist control. The LCS completion condition is a condition which is satisfied when the own lane switching occurs as a result of the traveling of the vehicle 10 along the lane change path Lt and subsequently, the own lane deviation Dc (in this case, the deviation of the traveling position of the vehicle 10 from the lateral center of the target lane) becomes smaller than a deviation threshold Sth. The DS ECU 20 sets the deviation threshold Sth such that the deviation threshold Sth is smaller than a half of the lane width Lw (namely, Lw/2) and increases with the lane width Lw.

When the DS ECU 20 ends the lane change assist control, the DS ECU 20 resumes the lane keeping control and ends the turn signal process (namely, either of the leftward turn signal process and the rightward turn signal process).

(Lane Change Assist Control—Cancellation Condition)

When an LCS cancellation condition is satisfied during execution of the lane change assist control, the DS ECU 20 executes a lane change cancellation process of stopping the lane change to the target lane and causing the vehicle 10 to travel along "a lane return path Lr extending from the present position of the vehicle 10 to the lateral center of the original lane."

The LCS cancellation condition is a condition which is satisfied when the possibility of collision of the vehicle 10 with another vehicle traveling in the target lane is high. More specifically, during execution of the lane change assist control as well, the DS ECU 20 executes the process of specifying the target lane front vehicle (a) and the target lane rear vehicle (b) every time a predetermined time elapses. The DS ECU 20 determines that the LCS cancellation condition is satisfied if at least one of the following conditions (ca) and (cb) is satisfied.
(ca) The forward collision time Tcf for the target lane front vehicle (a) is equal to or greater than "0" and is equal to or less than the collision time threshold Tcth (namely, $0 \leq Tcf \leq Tcth$).
(cb) The rearward collision time Tcr for the target lane rear vehicle (b) is equal to or greater than "0" and is equal to or less than the collision time threshold Tcth (namely, $0 \leq Tcr \leq Tcth$).

When the DS ECU 20 starts the lane change cancellation process, the DS ECU 20 determines the lane return path Lr by executing a process similar to the process of obtaining the lane change path Lt at the start of the lane change assist control. The final target lateral position of the lane return path Lr is the lateral center of the original lane.

During execution of the lane change cancellation process, the DS ECU 20 calculates the target lateral position at the elapsed time t from the lane change cancellation process start time (specifically, the moving amount in the lateral direction from the lane change cancellation process start time). The DS ECU 20 then computes the target steering angle θlca* such that the position of the vehicle 10 in the horizontal direction coincides with the target lateral position, and sends a request signal to the EPS ECU 33 such that the actual steering angle θs coincides with the target steering angle θlca*. As a result, the motor 71 is controlled through the drive circuit 69 such that the actual steering angle θs coincides with the target steering angle θlca*.

Figure 7:
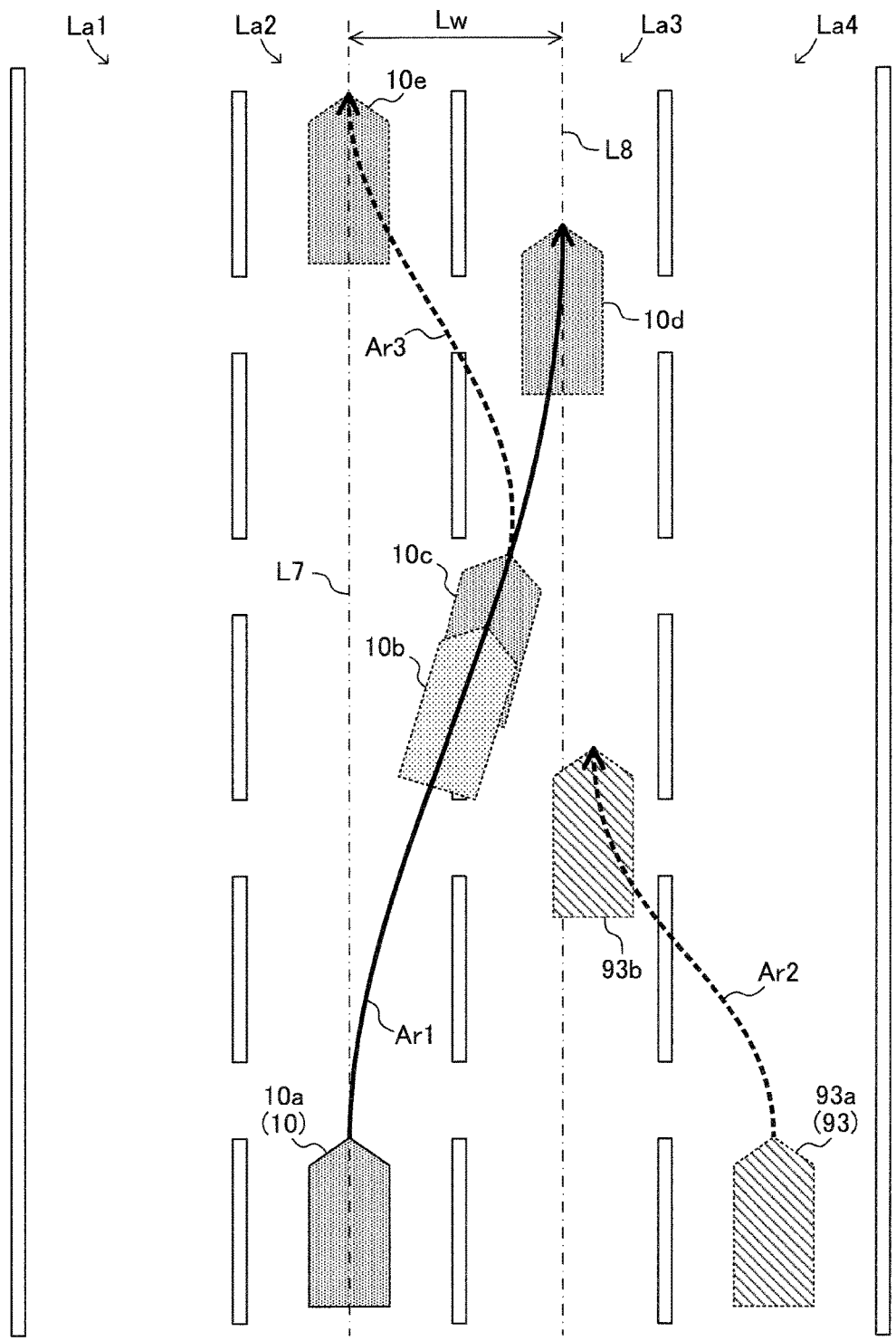
FIG. 7 is an illustration showing how the present vehicle performs a lane change by lane change assist control.

An example case where the lane change cancellation process is executed will be described with reference to FIG. 7. FIG. 7 is a schematic illustration showing a state in which the vehicle 10 is traveling in a straight section of a motorway having four lanes on each side. A lane La1 is the left lane. A lane La2 is the own lane. A lane La3 is the right lane. A lane La4 is a lane located adjacent to and on the right side of the right lane.

A broken line L7 represents the lateral center of the lane La2. A broken line L8 represents the lateral center of the lane La3. The lane width Lw obtained by the own lane information obtainment process when the vehicle 10 travels in the lane La2 is equal to the lane width Lw obtained by the own lane information obtainment process when the vehicle 10 travels in the lane La3. Accordingly, the distance between the broken lines L7 and L8 in the lateral direction is Lw.

If the lane change cancellation process is not executed, in the example of FIG. 7, the DS ECU 20 starts the lane change assist control at the point in time when the vehicle 10 is located at a position 10*a*, so that the vehicle 10 travels along the lane change path Lt represented by a solid line arrow Ar1. Namely, the vehicle 10 reaches a position 10*d* after passing through positions 10*b* and 10*c*. When the vehicle 10 approaches the position 10*d* and the own lane deviation Dc becomes smaller than the deviation threshold Sth, the DS ECU 20 ends the lane change assist control. In the present example, the lane La2 is the original lane, and the lane La3 is the target lane.

Here, a case will be considered where, when the vehicle 10 undergoing the lane change assist control is located at the position 10*c*, another vehicle 93 traveling from a position 93*a* along a path represented by a broken line arrow Ar2 reaches a position 93*b* after a lane change from the lane La4 to the lane La3. In this case, the DS ECU 20 specifies the vehicle 93 located at the position 93*b* as the target lane rear vehicle. In this example, the rearward collision time Tcr for the vehicle 93 at that point in time is a positive value and is smaller than the collision time threshold Tcth. Accordingly, the LCS cancellation condition is satisfied, and as a result, the DS ECU 20 starts the lane change cancellation process.

As a result of the lane change cancellation process, the vehicle 10 travels along the lane return path Lr represented by a broken line arrow Ar3 and reaches a position 10*e*. In this case, when the vehicle 10 reaches the position 10*e*, the DS ECU 20 ends the lane change assist control.

(Specific Operation)

Figure 8:
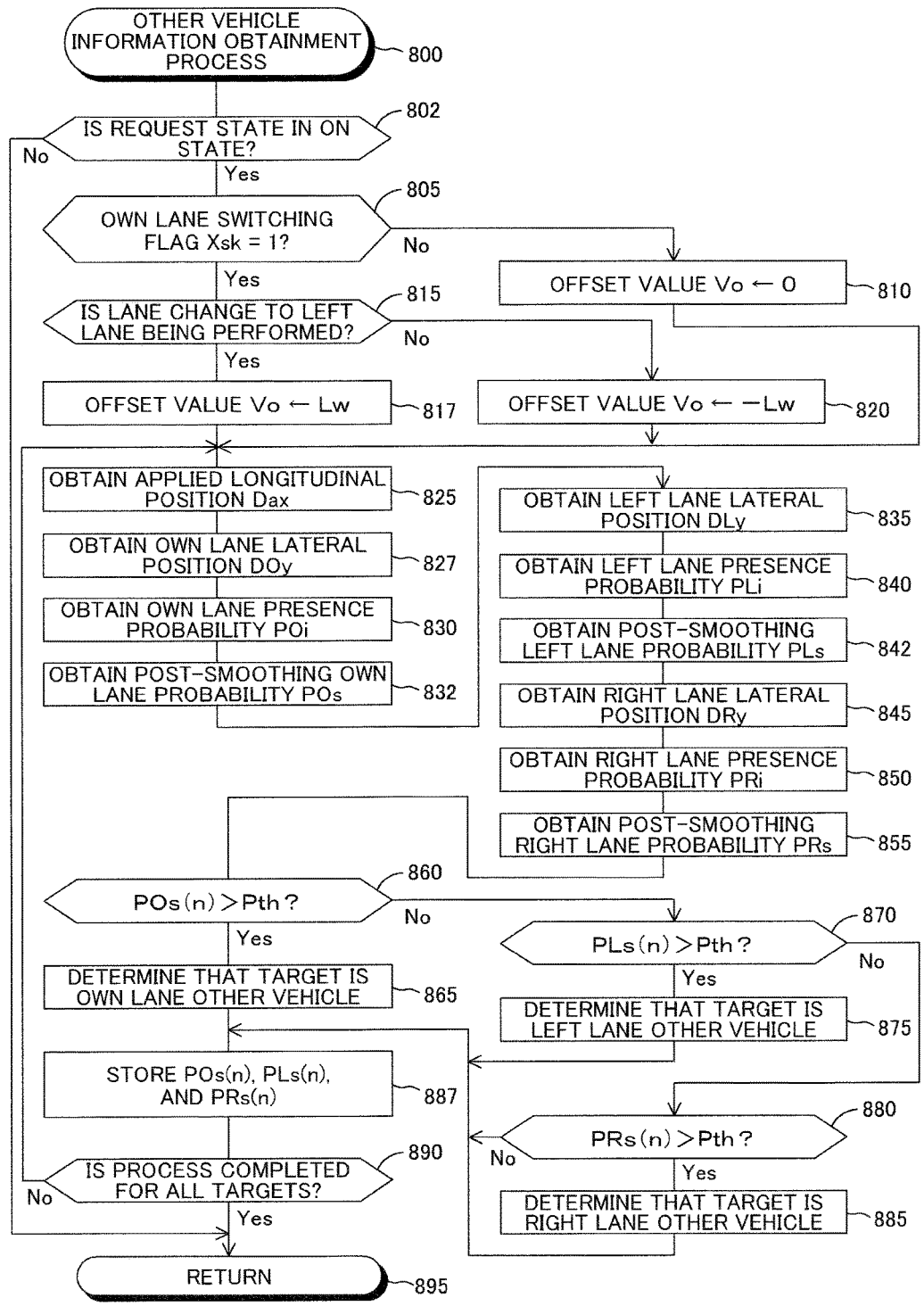
FIG. 8 is a flowchart representing an other vehicle information obtainment process routine executed by the present assist apparatus.

Next, specific operation of the DS ECU 20 will be described. Every time a predetermined time Δt elapses, the CPU of the DS ECU 20 (hereinafter also referred to as "the CPU" for simplification) executes "an other vehicle information obtainment process routine" represented by a flowchart in FIG. 8. The other vehicle information obtainment process routine is executed as a portion of the surrounding vehicle information obtainment process. In addition, when the lane change assist control is not executed, the CPU executes "a lane change assist control routine" represented by a flowchart in FIG. 9 every time a predetermined time elapses.

First, the other vehicle information obtainment process routine will be described. When a proper timing has come, the CPU starts the process from step 800 of FIG. 8 and proceeds to step 802 so as to determine whether or not the request state of the follow-up vehicle-to-vehicle distance control is in the ON state. In the case where the request state of the follow-up vehicle-to-vehicle distance control is in the OFF state, the CPU makes a "No" determination in step 802 and proceeds to step 895 so as to end the present routine.

Meanwhile, in the case where the request state of the follow-up vehicle-to-vehicle distance control is in the ON state, the CPU makes a "Yes" determination in step 802 and proceeds to step 805 so as to determine whether or not the value of an own lane switching flag Xsk is "1."

Figure 9:
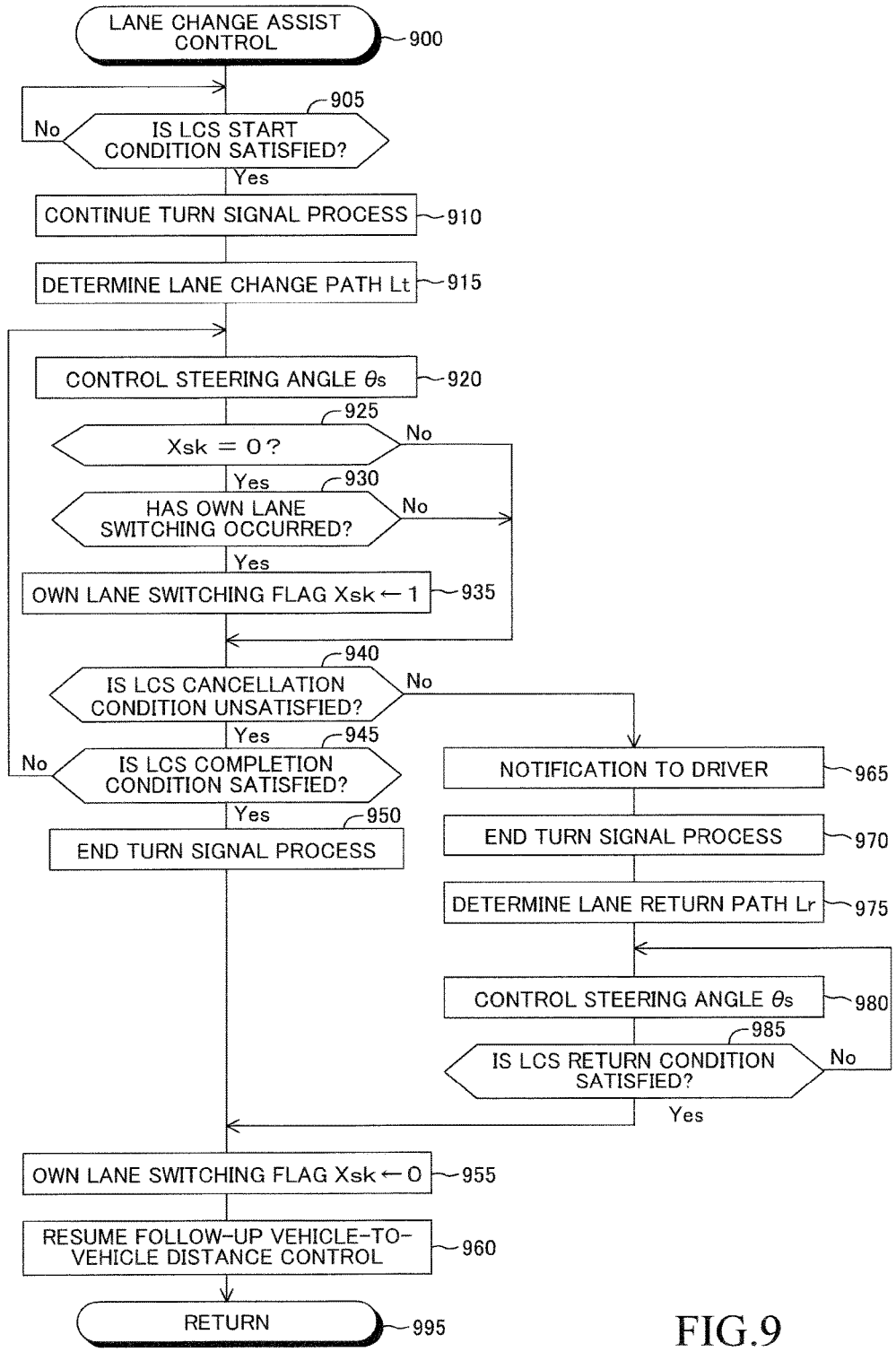
FIG. 9 is a flowchart representing a lane change assist control routine executed by the present assist apparatus.

The own lane switching flag Xsk is set to "1" by the lane change assist control routine of FIG. 9 when the above-described own lane switching occurs during execution of the lane change assist control. The own lane switching flag Xsk is set to "0" in an initial routine (not shown) which is executed by the CPU when the DS ECU 20 is started (namely, when an illustrated ignition key switch of the vehicle 10 is moved from an OFF position to an ON position).

In the case where the value of the own lane switching flag Xsk is "0," the CPU makes a "No" determination in step 805 and proceeds to step 810 so as to set an offset value Vo to "0." Subsequently, the CPU proceeds to step 825.

Meanwhile, in the case where the value of the own lane switching flag Xsk is "1," the CPU makes a "Yes" determination in step 805 and proceeds to step 815 so as to determine whether or not the vehicle 10 is performing a lane change to the left lane by the lane change assist control. In the case where the vehicle 10 is performing a lane change to the left lane, the CPU makes a "Yes" determination in step 815 and proceeds to step 817 so as to set the offset value Vo to the lane width Lw. Subsequently, the CPU proceeds to step 825.

In the case where the vehicle 10 is performing a lane change to the right lane, the CPU makes a "No" determination in step 815 and proceeds to step 820 so as to set the offset value Vo to a value obtained by multiplying the lane width Lw by "−1" (namely, −Lw). Subsequently, the CPU proceeds to step 825.

When the CPU proceeds to step 825, the CPU successively executes the processes of steps 825 to 855 to be described later, and proceeds to step 860.

Step 825: The CPU selects one of the targets (n) contained in the corrected target information and obtains the applied longitudinal position Dax(n) of the selected target (n) on the basis of the corrected longitudinal position Dmx(n) as described above.

Step 827: The CPU obtains the own lane lateral position DOy(n) of the target (n) as the sum of the corrected lateral position Dmy(n), the own lane deviation Dc, and the offset value Vo (namely, DOy(n)←Dmy(n)+Dc+Vo).

Step 830: The CPU obtains the own lane presence probability POi(n) by applying the applied longitudinal position Dax(n) and the own lane lateral position DOy(n) of the target (n) to the lane probability map of FIG. 5. Accordingly, if the offset value Vo is set to the lane width Lw, the leftward offset process is executed. Meanwhile, if the offset value Vo is set to the value obtained by multiplying the lane width Lw by "−1" (namely, −Lw), the rightward offset process is executed.

Step 832: The CPU calculates the post-smoothing own lane probability POs(n) in accordance with the above-described Equation (1). Notably, the previous post-smoothing own lane probability POp(n) in Equation (1) is the value set in step 887 (which will be described later) when the present routine was executed the predetermined time Δt ago. The previous post-smoothing own lane probability POp(n) is set to "0" in the above-described initial routine.

Step 835: The CPU obtains the left lane lateral position DLy(n) of the target (n) as the sum of a value obtained by multiplying the lane width Lw by "−1," the corrected lateral position Dmy(n), the own lane deviation Dc, and the offset value Vo (namely, DLy(n)←−Lw+Dmy(n)+Dc+Vo).

Step 840: The CPU obtains the left lane presence probability PLi(n) by applying the applied longitudinal position Dax(n) and the left lane lateral position DLy(n) of the target (n) to the lane probability map of FIG. 5. Accordingly, if the offset value Vo is set to the lane width Lw, the leftward offset process is executed. Meanwhile, if the offset value Vo is set to the value obtained by multiplying the lane width Lw by "−1" (namely, −Lw), the rightward offset process is executed.

Step 842: The CPU calculates the post-smoothing left lane probability PLs(n) in accordance with the above-described Equation (2). Notably, the previous post-smoothing left lane probability PLp(n) in Equation (2) is the value set in step 887 (which will be described later) when the present routine was executed the predetermined time Δt ago. The previous post-smoothing left lane probability PLp(n) is set to "0" in the above-described initial routine.

Step 845: The CPU obtains the right lane lateral position DRy(n) of the target (n) as the sum of the lane width Lw, the corrected lateral position Dmy(n), the own lane deviation Dc, and the offset value Vo (namely, DRy(n)←Lw+Dmy(n)+Dc+Vo).

Step 850: The CPU obtains the right lane presence probability PRi(n) by applying the applied longitudinal position Dax(n) and the right lane lateral position DRy(n) of the target (n) to the lane probability map of FIG. 5. Accordingly, if the offset value Vo is set to the lane width Lw, the leftward offset process is executed. Meanwhile, if the offset value Vo is set to the value obtained by multiplying the lane width Lw by "−1" (namely, −Lw), the rightward offset process is executed.

Step 855: The CPU calculates the post-smoothing right lane probability PRs(n) in accordance with the above-described Equation (3). Notably, the previous post-smoothing right lane probability PRp(n) in Equation (3) is the value set in step 887 (which will be described later) when the present routine was executed the predetermined time Δt ago. The previous post-smoothing right lane probability PRp(n) is set to "0" in the above-described initial routine.

In step 860, the CPU determines whether or not the post-smoothing own lane probability POs(n) is greater than the probability threshold Pth. In the case where the post-smoothing own lane probability POs(n) is greater than the probability threshold Pth, the CPU makes a "Yes" determination in step 860 and proceeds to step 865 so as to determine that the target (n) is the own lane other vehicle. Subsequently, the CPU proceeds to step 887.

Meanwhile, in the case where the post-smoothing own lane probability POs(n) is equal to or less than the probability threshold Pth, the CPU makes a "No" determination in step 860 and proceeds to step 870 so as to determine whether or not the post-smoothing left lane probability PLs(n) is greater than the probability threshold Pth. In the case where the post-smoothing left lane probability PLs(n) is greater than the probability threshold Pth, the CPU makes a "Yes" determination in step 870 and proceeds to step 875 so as to determine that the target (n) is the left lane other vehicle. Subsequently, the CPU proceeds to step 887.

In the case where the post-smoothing left lane probability PLs(n) is equal to or less than the probability threshold Pth, the CPU makes a "No" determination in step 870 and proceeds to step 880 so as to determine whether or not the post-smoothing right lane probability PRs(n) is greater than the probability threshold Pth. In the case where the post-smoothing right lane probability PRs(n) is greater than the probability threshold Pth, the CPU makes a "Yes" determination in step 880 and proceeds to step 885 so as to determine that the target (n) is the right lane other vehicle. Subsequently, the CPU proceeds to step 887.

Meanwhile, in the case where the post-smoothing right lane probability PRs(n) is equal to or less than the probability threshold Pth, the CPU makes a "No" determination in step 880 and proceeds to step 887.

In step 887, the CPU stores the post-smoothing own lane probability POs(n) in the RAM of the DS ECU 20 as the previous post-smoothing own lane probability POp(n) which is referred to in step 832 when the present routine is executed next time. In addition, the CPU stores the post-smoothing left lane probability PLs(n) in the RAM of the DS ECU 20 as the previous post-smoothing left lane probability PLp(n) which is referred to in step 842 when the present routine is executed next time. Further, the CPU stores the post-smoothing right lane probability PRs(n) in the RAM of the DS ECU 20 as the previous post-smoothing right lane probability PRp(n) which is referred to in step 855 when the present routine is executed next time.

Next, the CPU proceeds to step 890 so as to determine whether or not the above-described process (namely, the process of determining whether the target (n) corresponds to the own lane other vehicle, the left lane other vehicle, or the right lane other vehicle) has been performed for all the targets (n) contained in the corrected target information. In the case where the above-described process has been performed for all the targets (n) contained in the corrected target information, the CPU makes a "Yes" determination in step 890 and proceeds to step 895.

Meanwhile, in the case where the above-described process has not yet been performed for all the targets (n) contained in the corrected target information (namely, there exists any target (n) for which the above-described process has not been performed), the CPU makes a "No" determination in step 890 and proceeds to step 825.

Next, the lane change assist control routine will be described. When a proper timing has come, the CPU starts the process from step 900 of FIG. 9 and proceeds to step 905 so as to determine whether or not the LCS start condition is satisfied.

In the case where the above-described LCS start condition is not satisfied (namely, unless all the above-described conditions (S1) to (S8) are satisfied (in other words, when some of or all the above-described conditions (S1) to (S8) are not satisfied)), the CPU makes a "No" determination in step 905 and proceeds to step 905.

Meanwhile, in the case where the above-described LCS start condition is satisfied (namely, all the above-described conditions (S1) to (S8) are satisfied), the CPU makes a "Yes" determination in step 905 and proceeds to step 910 so as to continue the turn signal process (namely, either one of the leftward turn signal process and the rightward turn signal process). Namely, even when the winker lever 52 has returned to the neutral position, the turn signal process is executed. Notably, the turn signal process has been started when the winker lever 52 was moved to the first step position in the counterclockwise direction or the first step position in the clockwise direction as a result of an operation by the driver of the vehicle 10 for requesting the lane change assist.

Subsequently, the CPU proceeds to step 915 so as to obtain (determine) the lane change path Lt on the basis of the above-described process. After that, the CPU proceeds to step 920 so as to determine the target steering angle θlca* such that the vehicle 10 travels along the lane change path Lt and sends a request signal to the EPS ECU 33 such that the actual steering angle θs becomes equal to the target steering angle θlca*. As a result, the EPS ECU 33 executes an unillustrated routine, whereby the steering angle θs is controlled.

Subsequently, the CPU proceeds to step 925 so as to determine whether or not the value of the own lane switching flag Xsk is "0."

Since the own lane switching does not occur immediately after the LCS start condition has been satisfied, the value of the own lane switching flag Xsk is "0." Therefore, the CPU makes a "Yes" determination in step 925 and proceeds to step 930 so as to determine whether or not the own lane switching has occurred. Specifically, the CPU determines whether or not the sign of the own lane deviation Dc obtained last by the own lane information obtainment process differs from the sign of the own lane deviation Dc obtained when the present step (namely, step 930) was executed last time (hereinafter referred to as "a previous own lane deviation Dcp").

Since the own lane switching has not occurred in this stage, the sign of the own lane deviation Dc and the sign of the previous own lane deviation Dcp are the same (namely, Dc·Dcp>0). Accordingly, the CPU makes a "No" determination in step 930 and proceeds to step 940.

In step 940, the CPU determines whether or not the above-described LCS cancellation condition is satisfied. In the case where the LCS cancellation condition is not satisfied, the CPU makes a "Yes" determination in step 940 and proceeds to step 945 so as to determine whether or not the above-described LCS completion condition is satisfied.

Since the own lane switching has not occurred in this stage, the LCS completion condition is not satisfied. Therefore, the CPU makes a "No" determination in step 945 and proceeds to step 920.

After that, when the state in which the LCS cancellation condition is not satisfied continues, the own lane switching occurs. In this case, the sign of the own lane deviation Dc and the sign of the previous own lane deviation Dcp differ from each other (namely, Dc·Dcp<0). Accordingly, when the CPU proceeds to step 930, the CPU makes a "Yes" determination in step 930 and proceeds to step 935 so as to set the value of the own lane switching flag Xsk to "1." Subsequently, the CPU makes a "Yes" determination in step 940, makes a "No" determination in step 945, and returns to step 920. At this point in time, the value of the own lane switching flag Xsk is "1." Therefore, the CPU makes a "No" determination in the next step 925 and proceeds to step 940.

Further, when the state in which the LCS cancellation condition is not satisfied continues, the LCS completion condition is satisfied. In this case, when the CPU proceeds to step 945, the CPU makes a "Yes" determination in step 945 and proceeds to step 950 so as to end the turn signal process (the leftward turn signal process or the rightward turn signal process).

Subsequently, the CPU proceeds to step 955 and sets the value of the own lane switching flag Xsk to "0." Further, the CPU proceeds to step 960 so as to resume the follow-up vehicle-to-vehicle distance control and the lane keeping control. After that, the CPU proceeds to step 995 so as to end the present routine.

Meanwhile, in the case where the LCS cancellation condition is satisfied in the period between the point in time when the LCS start condition was satisfied and the point in time when the LCS completion condition is satisfied, when the CPU proceeds to step 940, the CPU makes a "No" determination in step 940 and proceeds to step 965. In step 965, the CPU causes the speakers 49 to reproduce a warning sound to thereby notify the driver that the lane change to the target lane is stopped and the vehicle will return to the original lane.

Next, the CPU proceeds to step 970 so as to end the turn signal process (the leftward turn signal process or the rightward turn signal process). Further, the CPU proceeds to step 975 so as to determine the lane return path Lr which extends from the present position of the vehicle 10 to the lateral center of the original lane.

Subsequently, the CPU proceeds to step 980 so as to determine the target steering angle θlca* such that the vehicle 10 travels along the lane return path Lr and sends a request signal to the EPS ECU 33 such that the actual steering angle θs becomes equal to the target steering angle θlca*. As a result, the EPS ECU 33 executes the unillustrated routine, whereby the steering angle θs is controlled.

Subsequently, the CPU proceeds to step 985 so as to determine whether or not an LCS return condition is satisfied. The LCS return condition is a condition which is satisfied when the vehicle 10 reaches the lateral center of the original lane as a result of traveling along the lane return path Lr.

In the case where the LCS return condition is not satisfied, the CPU makes a "No" determination in step 985 and proceeds to step 980. Meanwhile, in the case where the LCS return condition is satisfied, the CPU makes a "Yes" determination in step 985 and proceeds to step 955 and steps subsequent thereto.

As having been described above, in the present assist apparatus, the waiting time between the point of completion of a first lane change assist control and the point of start of "a second lane change assist control in the same direction as the first lane change assist control" is rendered longer than the re-change prohibition time Tint. Therefore, according to the present assist apparatus, before the second lane change assist control is started, the determination as to whether or not the possibility of collision with another vehicle traveling in a new target lane is high can be made properly. In addition, according to the present assist apparatus, the driver of the vehicle 10 can easily recognize the beginning of a period which extends from the end of the first lane change assist control to the start of the second lane change assist control and whose length is the re-change prohibition time Tint.

The embodiment of the driving assist apparatus according to the present invention has been described; however, the present invention is not limited to the above-described embodiment, and various modifications are possible without departing from the scope of the invention. For example, the DS ECU 20 according to the present embodiment obtains the target information from the millimeter wave radar 42. However, the DS ECU 20 may obtain the target information by a different method. For example, the DS ECU 20 may obtain the target information from a laser radar provided in the vehicle 10.

The DS ECU 20 according to the present embodiment executes the lane change assist control for a lane change to the left lane and the lane change assist control for a lane change to the right lane when a predetermined condition is satisfied. However, the DS ECU 20 may execute only the lane change assist control for a lane change to the left lane. Alternatively, the DS ECU 20 may execute only the lane change assist control for a lane change to the right lane.

The DS ECU 20 according to the present embodiment determines that the LCS completion condition is satisfied when the own lane deviation Dc becomes smaller than the deviation threshold Sth. However, the LCS completion condition may be a condition different from the condition described above. For example, the DS ECU 20 may determine that the LCS completion condition is satisfied when a predetermined time elapses after occurrence of the own lane switching. Further, the DS ECU 20 may set this predetermined time such that the greater the lane width Lw, the longer the predetermined time.

The DS ECU 20 according to the present embodiment calculates the post-smoothing own lane probability POs(n), the post-smoothing left lane probability PLs(n), and the post-smoothing right lane probability PRs(n) in accordance with the above-described Equations (1), (2), and (3). However, the DS ECU 20 may obtain the post-smoothing own lane probability POs(n), the post-smoothing left lane probability PLs(n), and the post-smoothing right lane probability PRs(n) by a different method. For example, the DS ECU 20 may obtain, as the post-smoothing own lane probability POs(n), the average of own lane presence probabilities POi(n) obtained by the own lane presence probability obtainment process executed a predetermined number of times latest. Similarly, the DS ECU 20 may obtain, as the post-smoothing left lane probability PLs(n), the average of left lane presence probabilities PLi(n) obtained by the left lane presence probability obtainment process executed a predetermined number of times latest. Similarly, the DS ECU 20 may obtain, as the post-smoothing right lane probability PRs(n), the average of right lane presence probabilities PRi(n) obtained by the right lane presence probability obtainment process executed a predetermined number of times latest.

The DS ECU 20 according to the present embodiment determines whether or not the vehicle 10 collides with another vehicle traveling in the target lane on the basis of the forward collision time Tcf and the rearward collision time Tcr. However, the DS ECU 20 may determine whether or not the vehicle 10 collides with another vehicle traveling in the target lane by a different method. For example, the DS ECU 20 may determine that the vehicle 10 does not collide with another vehicle traveling in the target lane when the minimum value (estimated value) of the magnitude of the distance in the longitudinal direction between the vehicle 10 and the target lane front vehicle (a) is greater than a predetermined value and the minimum value (estimated value) of the magnitude of the distance in the longitudinal direction between the vehicle 10 and the target lane rear vehicle (b) is greater than a predetermined value.

The lane probability map used in the present embodiment is a two-dimensional map shown in FIG. 5. However, the lane probability map may change with the vehicle speed Vs. For example, the lane probability map may be used after being modified such that the lane probability map expands in the direction of the longitudinal axis as the vehicle speed Vs increases.

What is claimed is:

1. A driving assist apparatus comprising:
    a sensor configured to detect at least one target present around an own vehicle; and
    an electronic control unit (ECU) configured to:
        obtain a target position representing a position of said target in relation to said own vehicle;
        obtain a target lane probability regarding said detected target in accordance with said target position, said target lane probability increasing with a possibility that said target is a target lane other vehicle which is another vehicle traveling in a target lane which is a lane located adjacent, in a specific direction which is a leftward or rightward direction, to a lane in which said own vehicle is traveling;
        obtain a post-smoothing probability regarding said detected target by smoothing a time course change in said target lane probability regarding said detected target;
        extract said target as said target lane other vehicle when said post-smoothing probability regarding said detected target is greater than a predetermined probability threshold;
        execute a lane change assist control for assisting a lane change to said target lane by controlling a turn angle of turnable wheels of said own vehicle when predetermined control start conditions are satisfied, the control start conditions including a determination that said own vehicle does not collide with said extracted target lane other vehicle during said lane change to said target lane; and
        prohibit execution of said lane change assist control for a new lane change to a lane adjacent to said target lane in said specific direction until a predetermined re-change prohibition time elapses after a predetermined specific condition is satisfied, the specific condition including entry of said own vehicle into said target lane.

2. The driving assist apparatus according to claim 1, wherein:
    said control start conditions include a condition that a specific operation performed on a winker lever of said own vehicle has continued beyond a predetermined time, continuation of said specific operation resulting in execution of a turn signal process of blinking a direction indicator of said own vehicle, and
    the ECU is configured to continue said turn signal process, even when said specific operation is not performed, during a period between a point when said lane change assist control has been started and a point when said specific condition is satisfied.

* * * * *